United States Patent
Wang et al.

(10) Patent No.: US 10,448,233 B2
(45) Date of Patent: Oct. 15, 2019

(54) EMERGENCY COMMUNICATION IN A WIRELESS SYSTEM

(71) Applicant: Google LLC, Mountain View, CA (US)

(72) Inventors: Jibing Wang, Saratoga, CA (US); Neil Hendin, Mountain View, CA (US); Erik Richard Stauffer, Sunnyvale, CA (US); Aamir Akram, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/986,754

(22) Filed: May 22, 2018

(65) Prior Publication Data
US 2019/0141507 A1 May 9, 2019

Related U.S. Application Data

(60) Provisional application No. 62/583,358, filed on Nov. 8, 2017.

(51) Int. Cl.
*H04W 76/50* (2018.01)
*H04W 4/90* (2018.01)
(Continued)

(52) U.S. Cl.
CPC .............. *H04W 4/90* (2018.02); *H04B 17/21* (2015.01); *H04L 41/5022* (2013.01);
(Continued)

(58) Field of Classification Search
CPC .................................. H04W 4/90; H04W 52/38
See application file for complete search history.

(56) References Cited

U.S. PATENT DOCUMENTS 8,559,915 B2  10/2013  Shi
8,909,282 B2  12/2014  Ngai et al.
(Continued)

OTHER PUBLICATIONS

"International Search Report and Written Opinion", PCT Application No. PCT/US2018/047121, dated Dec. 14, 2018, 26 pages.
(Continued)

*Primary Examiner* — Said M Elnoubi
(74) *Attorney, Agent, or Firm* — Colby Nipper

(57) ABSTRACT

The present disclosure describes methods and apparatuses for enhancing emergency communications in a wireless system. Implementations can be realized with an end-user device, a base station, or a combination thereof. Described implementations facilitate the institution of emergency communications with a heightened level of reliability to increase the safety of an end-user that is relying on a wireless connection to make an emergency communication. Example implementations include local transmission priority elevation, automatic audio channel modification, transmission power boosting, end-user interaction control, modulation scheme adjustment, robust category selection, prioritized resource assignment, and so forth. In some aspects, an end-user device includes a transmission data buffer to store emergency communication data having a first priority level and other communication data having a second priority level. A transmission priority elevation module elevates the first priority level above the second priority level based on the first priority level being associated with the emergency communication data.

20 Claims, 22 Drawing Sheets

(51) Int. Cl.

| | |
|---|---|
| *H04W 52/38* | (2009.01) |
| *H04L 12/24* | (2006.01) |
| *H04W 52/36* | (2009.01) |
| *H04W 88/02* | (2009.01) |
| *H04B 17/21* | (2015.01) |
| *H04W 4/02* | (2018.01) |
| *H04W 52/04* | (2009.01) |
| *H04W 60/00* | (2009.01) |
| *H04L 29/08* | (2006.01) |

(52) U.S. Cl.
CPC ....... *H04W 52/365* (2013.01); *H04W 52/367* (2013.01); *H04W 52/38* (2013.01); *H04W 88/02* (2013.01); *H04L 41/0803* (2013.01); *H04L 41/22* (2013.01); *H04L 67/18* (2013.01); *H04W 4/02* (2013.01); *H04W 52/04* (2013.01); *H04W 60/00* (2013.01); *H04W 76/50* (2018.02)

(56) References Cited

U.S. PATENT DOCUMENTS

| | | | | |
|---|---|---|---|---|
| 2004/0151144 | A1* | 8/2004 | Benveniste | H04M 11/04 370/336 |
| 2005/0043008 | A1* | 2/2005 | Hurita | H04W 76/50 455/404.1 |
| 2013/0107718 | A1 | 5/2013 | Edara et al. | |
| 2014/0146170 | A1* | 5/2014 | Tofighbakhsh | G08B 25/016 348/143 |
| 2016/0205525 | A1* | 7/2016 | Baghel | H04W 52/38 370/329 |
| 2017/0064649 | A1 | 3/2017 | Feuersaenger et al. | |

OTHER PUBLICATIONS

"Invitation to Pay Additional Fees", PCT Application No. PCT/US2018/047121, Oct. 22, 2018, 19 pages.

"Government Emergency Telecommunications Service", U.S. Department of Homeland Security; Office of Emergency Communications; Version 3/17, Mar. 2017, 2 pages.

"How it Works: The Government Emergency Telecommunications Service", U.S. Department of Homeland Security; Office of Emergency Communications; Version 5/17, May 2017, 4 pages.

"Making a Combined WPS and GETS Call", U.S. Department of Homeland Security; Office of Emergency Communications; Version 5/17, May 2017, 2 pages.

"Making a Wireless Priority Service (WPS) Call", U.S. Department of Homeland Security; Office of Emergency Communications; Version 05/17, May 2017, 1 page.

"Priority Telecommunications Services", U.S. Department of Homeland Security; Office of Emergency Communications; retrieved from https://www.dhs.gov/sites/default/files/publications/PTS%20Brochure_7%2010%202017_FINAL%20508C.pdf on Apr. 30, 2019, 2 pages.

"Wireless Priority Service", U.S. Department of Homeland Security; Office of Emergency Communications; Version 3/17, Mar. 2017, 1 page.

\* cited by examiner

EMERGENCY COMMUNICATION IN A WIRELESS SYSTEM

RELATED APPLICATION

This application claims the benefit of priority under 35 U.S.C. § 119(e) to U.S. Provisional Patent Application 62/583,358, filed on Nov. 8, 2017, which is hereby incorporated by reference in its entirety herein.

BACKGROUND

Electronic devices play integral roles in manufacturing, communication, healthcare, commerce, social interaction, and entertainment. For example, electronic devices enable the server farms that provide cloud-based, distributed computing functionality for commerce and communication. Devices with computing power are also embedded in many different types of modern equipment, from medical devices to appliances and from vehicles to industrial tools. Thus, electronic devices are manufactured in a multitude of sizes, powers, and form factors for an even greater array of purposes.

One particularly prominent purpose is communication. Communication between two electronic devices can be accomplished using one or more channels, such as a wired channel or a wireless channel. Wired channels typically offer greater bandwidth, but wired channels also require an electronic device to be physically tethered to the signal propagation conduit—e.g., a fiber optic cable or a twisted-pair wire. In contrast, electronic devices that are using a wireless channel are untethered and can be mobile because the signal propagation conduit includes air or free space. However, wireless channels are inferior to wired channels in some respects. For example, the usable bandwidth in a wireless channel is often lower than the usable bandwidth in a wired channel. Accordingly, electronic device manufacturers continue to search for ways to improve the usability of wireless channels for electronic communications.

This background description is provided to generally present the context of the disclosure. Unless otherwise indicated herein, material described in this section is neither expressly nor impliedly admitted to be prior art to the present disclosure or the appended claims.

SUMMARY

Techniques and apparatuses are described for enhancing emergency communication in a wireless system. These techniques and apparatuses enable a wireless communication that is associated with an emergency situation, such as a "911" emergency phone call, to be made with heightened reliability to thereby increase the safety of an end-user that is relying on a wireless connection to make an emergency communication. Implementations can be realized with an end-user device, a base station, or a coordinated interaction between the two. Example implementations include local transmission priority elevation, automatic audio channel modification, transmission power boosting, end-user interaction control, modulation scheme adjustment, robust category selection, prioritized air interface resource assignment, and so forth. Thus, an end-user device, for instance, can boost transmission power, elevate a transmission priority, adjust a modulation scheme, select a device category and reregister with a wireless network, and so forth, responsive to a determination that a communication is associated with an emergency indication. Activation of one or more of such measures increases a likelihood that an emergency communication between an end-user device and a base station can be made successfully.

In some aspects, an example method is performed by an end-user device to facilitate emergency communications. In the method, the end-user device determines that a communication is associated with an emergency situation, with the communication including emergency communication data. The end-user device elevates a priority of the emergency communication data above that of other communication data that corresponds to at least one non-emergency communication. Based on the elevated priority of the emergency communication data, the end-user device transmits, via a communication unit, the emergency communication data prior to the other communication data.

In some aspects, an example end-user device includes at least one processor and one or more computer-readable storage media. The storage media include at least one transmission data buffer configured to store emergency communication data and other communication data. The emergency communication data is associated with a first priority level, and the other communication data is associated with a second priority level. The storage media also include a transmission priority elevation module configured to elevate the first priority level above the second priority level based on the first priority level being associated with the emergency communication data. A communication unit is configured to transmit the emergency communication data from the transmission data buffer based on the elevated first priority level.

In some aspects, an example end-user device includes at least one processor and one or more computer-readable storage media having instructions stored thereon that, responsive to execution by the at least one processor, cause to be performed multiple operations. These operations include determining that a communication is associated with an emergency situation. The operations also include transmitting, using a communication unit, a first signal for the communication towards a base station of a wireless network using a first power level that comports with a maximum normal transmission power of the end-user device. The operations additionally include failing to ascertain that the first signal was successfully received by the base station. Responsive to the failing, a second power level that is greater than the maximum normal transmission power and is less than a calibrated maximum transmission power of the end-user device is determined. The operations further include transmitting, using the communication unit, a second signal for the communication towards the base station of the wireless network using the second power level.

In some aspects, an example end-user device includes transmission data means for buffering emergency communication data and other communication data. The emergency communication data is associated with a first priority level, and the other communication data is associated with a second priority level. The end-user device also includes transmission priority elevation means for elevating the first priority level above the second priority level based on the first priority level being associated with the emergency communication data. The end-user device is configured to transmit the emergency communication data to a base station based on the elevated first priority level generated by the transmission priority elevation means.

The details of one or more implementations are set forth in the accompanying drawings and the following description. Other features and advantages will be apparent from the description and drawings, as well as from the claims.

This Summary is provided to introduce subject matter that is further disclosed in the Detailed Description and Drawings. Accordingly, this Summary should not be considered to describe essential features nor used to limit the scope of the claimed subject matter.

BRIEF DESCRIPTION OF THE DRAWINGS

Apparatuses of and techniques for implementing emergency communication in a wireless system are described with reference to the following drawings. The same numbers are used throughout the drawings to reference like features and components:

FIG. 5-1 illustrates example schemes for implementing end-user interaction in conjunction with emergency communications in a wireless system.

FIG. 5-2 illustrates example methods for implementing end-user interaction in conjunction with emergency communications in a wireless system.

FIG. 6-1 illustrates example schemes for implementing transmission power boosting for emergency communication in a wireless system.

FIG. 6-2 illustrates example methods for implementing transmission power boosting for emergency communication in a wireless system.

FIG. 7-1 illustrates example schemes for implementing location-based transmission adjustment for emergency communication in a wireless system.

FIG. 7-2 illustrates example methods for implementing location-based transmission adjustment for emergency communication in a wireless system.

FIG. 8-1 illustrates example schemes for implementing transmission priority elevation for emergency communication in a wireless system.

FIG. 8-2 illustrates example methods for implementing transmission priority elevation for emergency communication in a wireless system.

FIG. 9-1 illustrates example schemes for implementing modulation scheme adjustment for emergency communication in a wireless system.

FIG. 9-2 illustrates example methods for implementing modulation scheme adjustment for emergency communication in a wireless system.

FIG. 10-1 illustrates example schemes for implementing category selection for association with a device for emergency communication in a wireless system.

FIG. 10-2 illustrates example methods for implementing category selection for association with a device for emergency communication in a wireless system.

FIG. 11-1 illustrates example schemes for implementing audio channel modification for emergency communication in a wireless system.

FIG. 11-2 illustrates example methods for implementing audio channel modification for emergency communication in a wireless system.

DETAILED DESCRIPTION

Overview

Figure 1:
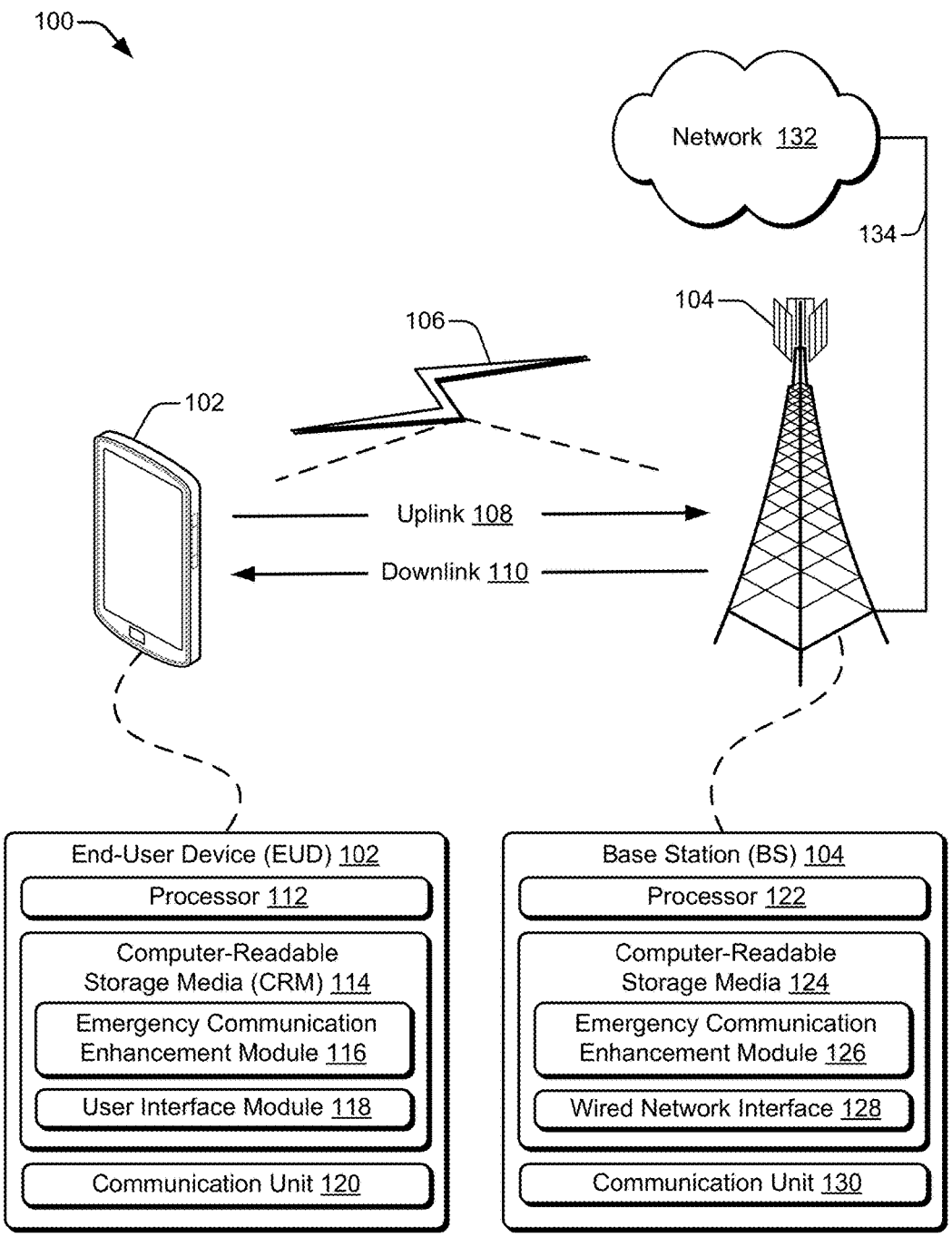
FIG. 1 illustrates an example environment including an end-user device and a base station in which emergency communication in a wireless system can be implemented.

Communication using a wireless channel offers several benefits over communication using a wired channel. These benefits principally flow from one significant difference between wired and wireless channels: An electronic device that communicates using a wired channel is physically tethered to a signal propagation conduit, but an electronic device using a wireless channel is not physically tethered. For a wireless channel, the signal propagation conduit includes the air. As a result, an electronic device that is capable of wireless communication can be mobile.

With this mobility, an electronic device can be easily moved from place to place between communications. Moreover, a mobile electronic device can be moved around during a wireless communication. This mobile capability provides convenience and has resulted in mobile electronic devices becoming ubiquitous. In other words, most people have a mobile electronic device—such as a cellular phone or a wearable computing device—on their person or within arm's reach for much of the day.

Unfortunately, wireless communications have some deficiencies relative to wired communications. First, wireless communications typically have a lower bandwidth than do wired communications. Second, wireless communications are usually less reliable than are wired communications. For example, unless a signal propagation conduit of a wired communication channel is physically cut or is otherwise damaged, a communication signal traveling on a wired signal propagation conduit has a high likelihood of being successfully received at a destination electronic device.

With a wireless communication channel, on the other hand, the likelihood of a wireless communication signal being correctly received at a destination electronic device is appreciably lower. Potential problems with a wireless communication channel include signal interference, a congested wireless signal propagation conduit, one or more intervening objects, signal attenuation due to an extended range between transmitter and receiver, regulatory constraints on signal transmissions, safety considerations that affect signal transmission options, the sharing of spectrum across space and over different frequencies, movement of an antenna of a mobile electronic device, and so forth. These various individual potential problems can also jointly affect a given wireless communication. A consequence of these potential problems is an increased likelihood that an attempted wireless communication fails to reach an intended destination device, or even that a wireless communication cannot be initiated at a would-be originating device. In short, the usability of wireless channels suffers because the reliability of wireless communications is typically lower than that of wired communications.

Thus, there is a tradeoff between reliability and accessibility with wired communications versus wireless communications. An individual is more likely to have a mobile electronic device on her person than a fixed electronic device, but the mobile electronic device is generally less reliable in terms of successfully completing a communication. In most situations, this tradeoff is acceptable. In emergency situations, however, this tradeoff is less acceptable and can cause a hazardous situation to become more dangerous or more life-threatening.

Even with the intrinsically greater reliability provided by wired communications, significant effort has been expended to help wired communication systems service wired communications that are intended to elicit an emergency response. For example, accommodations in wired communication systems were rolled out decades ago to handle 911 emergency calls reliably. Unfortunately, a comparable effort to help wireless communication systems handle emergency communications in a similarly reliable manner has not heretofore been undertaken.

To address this oversight, certain implementations that are described herein can facilitate a successful institution (e.g., initiation, establishment, conduction, or completion) of a wireless communication that has been designated as being associated with an emergency situation.

In some implementations, an end-user electronic device (e.g., user equipment (UE)) undertakes one or more measures to increase the likelihood that a communication associated with an emergency situation is successful. In other implementations, a base station electronic device undertakes one or more measures to increase the likelihood that a communication associated with an emergency situation is successful. In still other implementations, both an end-user electronic device and a base station electronic device undertake one or more measures to jointly increase the likelihood that a communication associated with an emergency situation is successful. In an example operation, an electronic device detects a communication. The electronic device determines if the detected communication is associated with an emergency situation. If not, the electronic device processes the communication normally. On the other hand, if the communication is determined to be associated with an emergency situation, the electronic device enhances the communication to facilitate a successful completion thereof.

Multiple different schemes are described herein to enhance communications that are associated with an emergency situation—which are also referred to herein as emergency communications. These schemes can be implemented by an end-user electronic device, which is also referred to herein as an end-user device. In an example scheme, an end-user device can temporarily boost transmission power beyond normal limits. Also, an end-user device can elevate a transmission priority of an emergency communication. In another example scheme, an end-user device can adjust a modulation scheme to render an emergency communication more robust under current conditions of a wireless channel. Analogously, an end-user device can select a category that prompts a base station electronic device to establish a more reliable link between the end-user electronic device and the base station. Further, an end-user device can modify an audio channel to facilitate the detection of local sounds occurring at the end-user device or the projection of sounds received from a remote source, such as a voice of an emergency operator. These various schemes can be used by an end-user device individually or in any combination.

Multiple different schemes to enhance communications that are associated with an emergency situation can also be implemented by a base station electronic device, which is also referred to herein as a base station. In an example scheme, a base station can assign robust parameters to an end-user device that is requesting to establish a link with the base station for an emergency communication. Alternatively, a base station can prioritize the scheduling of wireless resources for an end-user device that is making an emergency communication. These various schemes can be used by a base station individually or in any combination. Additionally, a base station can use one or more schemes in conjunction with one or more schemes that are being used by an end-user device such that a combination of measures is even more likely to result in the institution of a successful emergency communication.

In these manners, electronic devices can enhance communications that are associated with an emergency situation in wireless systems. Consequently, emergency communications can be made more reliably with wireless end-user electronic devices.

Example implementations in various levels of detail are discussed below with reference to the associated figures. The discussion below first describes an example operating environment, then example schemes and hardware in conjunction with example methods, and ends with an example electronic device and related example aspects.

Example Environment

FIG. 1 illustrates an example operating environment 100 in which an electronic device can realize an implementation of emergency communication in a wireless system. In this example, the operating environment 100 includes an end-user device 102 (EUD) and a base station 104 (BS) that are respectively configured to communicate over a wireless link 106 of a wireless network. Generally, the wireless link 106 can include an uplink 108 by which the end-user device 102 transmits data or control information to the base station 104 and a downlink 110 by which the base station 104 transmits data or control information to the end-user device 102. The wireless link 106 may be implemented in accordance with at least one suitable protocol or standard, such as a Global System for Mobile Communications (GSM) standard, a Worldwide Interoperability for Microwave Access (Wi-MAX) standard, a Universal Mobile Telecommunications System (UMTS) standard, a Wideband Code Division Multiple Access (WCDMA) standard, a High Speed Packet Access (HSPA) protocol, an Evolved HSPA (HSPA+) protocol, a Long-Term Evolution (LTE) standard (e.g., 4G), an LTE Advanced (LTE-A) standard, a Fifth Generation wireless network (5G) standard (e.g., as promulgated by the 3rd Generation Partnership Project (3GPP)), and so forth. Although the wireless link 106 is shown or described with reference to a separate uplink 108 or downlink 110, communication between the end-user device 102 and the base station 104 may also be referred to as a wireless communication, a wireless connection, wireless association, a frame exchange, a communication link, or the like.

In example implementations, the end-user device 102 includes at least one processor 112, one or more computer-readable storage media 114, and at least one communication unit 120. The end-user device 102 is illustrated as a smart phone; however, the end-user device 102 may instead be implemented as any device with wireless communication capabilities, such as a mobile gaming console, a tablet, a laptop, an Advanced Driver Assistance System (ADAS), a point-of-sale (POS) terminal, a health monitoring device, a drone, a vehicle, a camera, a media-streaming dongle, a wearable smart-device (e.g., a smartwatch or intelligent/augmented-reality (AR) glasses), an Internet-of-Things (IoT) device, a personal media device, a navigation device, a mobile-internet device (MID), a wireless hotspot, a femtocell, a broadband router, a mobile station, a user equipment (UE), or some combination thereof. The computer-readable storage media 114 can include an emergency communication enhancement module 116 and a user interface module 118.

The processor 112 of the end-user device 102 can execute processor-executable instructions or code stored by the computer-readable storage media 114 (CRM) to cause the end-user device to perform operations or implement various device functionalities. In some cases, the processor 112 is implemented as a general processor (e.g., a multicore processor), an application-specific integrated circuit (ASIC), or a system-on-chip (SoC) with other components of the end-user device integrated therein. The CRM 114 may include any suitable type of memory media or storage media, such as read-only memory (ROM), programmable ROM (PROM), random access memory (RAM), dynamic RAM (DRAM), static RAM (SRAM), or Flash memory. In the context of this discussion, the CRM 114 of the end-user device 102 is implemented as hardware-based storage media, which does not include transitory signals or carrier waves. In some cases, the CRM 114 stores firmware, an operating system, and/or applications of the end-user device 102 as instructions (e.g., a program or code) or other information. The instructions can be executed by the processor 112 to implement various functionalities of the end-user device 102, such as those related to emergency communications, a user interface, network access, audio features, and so forth. In this example, the CRM 114 stores processor-executable instructions to implement the emergency communication enhancement module 116 or the user interface module 118 of the end-user device 102.

The communication unit 120 of the end-user device 102 can include a receiver, a transmitter, and associated circuitry or other components (not shown) for communicating with the base station 104 via a wireless signal propagation conduit. For example, the communication unit 120 may transmit, via the transmitter, data or control information to the base station 104 via the uplink 108. This data or control information that is transmitted to the base station 102 may include any suitable type of framed or packetized information, such as device status information, wireless link status information, wireless link control information, data requests, communication data, network access requests, indications of communication type, and so forth. The communication unit 120 may also receive, via the receiver, data or control information via the downlink 110 from the base station 104, such as wireless link configuration settings, network control information, communication mode selection, and so forth.

In FIG. 1, the base station 104 is depicted generally as a cellular base station of a wireless network (not separately indicated). Through a wireless network, the base station 104 may enable or provide access to other networks or resources, such as the network 132 (e.g., the Internet) that is connected via a wired network interface 128 and a backhaul link 134 (e.g., fiber network). The base station 104 may be implemented to manage at least one cell of a wireless network that includes multiple other base stations that each manage other respective cells of the wireless network. As such, the base station 104 may communicate with a network management entity (not shown) or others of the multiple base stations to coordinate connectivity or hand-offs of end-user devices within or across the cells of the wireless network. The base station 104 can be configured as any suitable type of base station or network management node, such as a Global System for Mobile Communications (GSM) base station, a node base (Node B) transceiver station (e.g., for UMTS), an evolved NodeB (eNB, e.g., for LTE), or a next generation Node B (gNB, e.g., for 5G), and so forth. Thus, the base station 104 may control or configure parameters of the uplink 108 or the downlink 110 in accordance with one or more of the wireless standards or protocols described herein, such as by allocating resource units of available wireless spectrum.

In example implementations, the base station 104 includes at least one processor 122, one or more computer-readable storage media 124 (CRM), and at least one communication unit 130. The processor 122 can execute processor-executable instructions or code stored by the CRM 124 to perform operations or implement various base station functionalities. In some cases, the processor 122 is implemented as multiple processor cores or a multicore processor configured to execute firmware or an operating system of the base station 104. The CRM 124 may include any suitable type of memory media or storage media, such as ROM, PROM, RAM, DRAM, SRAM, or Flash memory. In the context of this discussion, the CRM 124 is implemented as hardware-based storage media, which does not include transitory signals or carrier waves. The CRM 124 of the base station 104 may store firmware, an operating system, or applications of the base station as instructions (e.g., a program or code) or other information. The instructions can be executed by the processor 122 to implement various functionalities of the base station 104, such as to manage connectivity or parameters of the wireless link 106 with the end-user device 102. In this example, the CRM 124 also stores processor-executable instructions for implementing the emergency communication enhancement module 126 of the base station 104.

In some aspects, a resource manager (not shown) of the base station 104 can be implemented to perform various functions associated with allocating physical access (e.g., resource blocks) or communication resources available to the base station 104. The physical access, such as an air interface of the base station 104, may be partitioned or divided into various units (e.g., frames) of bandwidth, time, carriers, symbols, or the like. Within a framework of an LTE standard, for example, the resource manager can allocate bandwidth and time intervals of access in resource blocks, each of which can be allocated in whole, or in part, to one or more end-user devices communicating with the base station 104.

The resource manager can also communicate, to the end-user device 102 via the downlink 110, an identification of the assigned resource elements for a communication. The identification may include one or both of frequencies or time locations of respective resource elements (REs) of the assigned resource elements. The one or both of frequencies or time locations may be effective to enable the end-user device 102 to communicate in a mode or manner as described herein via the assigned resource elements. In such an instance, the indication may be communicated from the base station 104 to the end-user device 102 as part of a Radio Resource Control (RRC) message, a Downlink Control Information (DCI) message, or the like.

The communication unit 130 of the base station 104 includes a receiver, a transmitter, and associated circuitry or other components (not shown) for communicating with the end-user device 102 via the wireless signal propagation conduit for a wireless link 106. In some cases, the communication unit 130 includes or is coupled with multiple transceivers and antenna arrays that are configured to establish and manage multiple wireless links with respective ones of multiple end-user devices, including using antenna beamforming to realize directionality for wireless communications. The base station 104 may communicate any suitable data or control information to the end-user device 102 (or other devices) through the downlink 110, such as a schedule of allocated resource elements, communication data, wireless link status information, wireless link control information, or the like.

Figure 2:
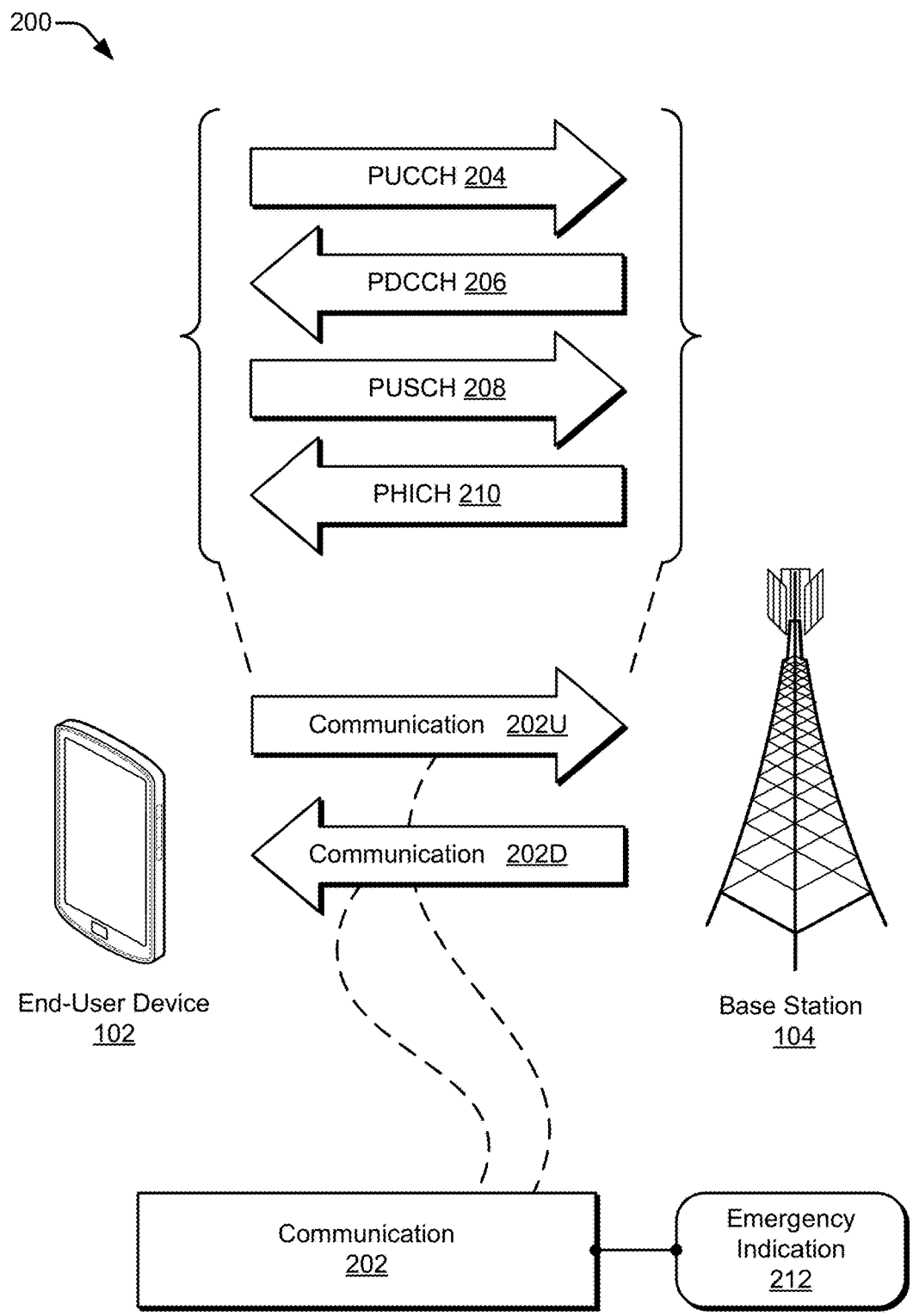
FIG. 2 illustrates other aspects of an example environment in which emergency communication in a wireless system can be implemented.

FIG. 2 illustrates an example wireless system 200 in which an end-user device 102 and a base station 104 may communicate in accordance with one or more aspects. The wireless system 200 includes respective instances of the end-user device 102 and the base station 104. The base station 104 provides a portion of a wireless network with which the end-user device 102 may associate to enable wireless communications. The wireless system 200 may include other base stations, a network management entity, and so forth to provide a wireless wide area network (WWAN), such as an LTE or a 5G New Radio (NR) network with associated data services.

The end-user device 102 and/or the base station 104 may communicate through any suitable type or combination of channels, message exchanges, or network management procedures using at least one communication 202. As shown, such communications 202 can include an uplink communication 202U from the end-user device 102 to the base station 104 and a downlink communication 202D from the base station 104 to the end-user device 102. The uplink communication 202U can include an uplink data channel and/or an uplink control channel (not explicitly shown). Similarly, the downlink communication 202D can include a downlink data channel and/or a downlink control channel (not explicitly shown).

The wireless system 200 can be implemented to comport with any of one or more different wireless standards or protocols. However, an example implementation that comports with an LTE standard is described with reference to FIG. 2. In this example, the end-user device 102 can transmit control information to the base station 104 via a physical uplink control channel 204 (PUCCH). The PUCCH 204 may be useful to transmit to the base station 104 one or more uplink communications 202U: a hybrid automatic repeat request (HARQ), an acknowledge/not acknowledge (ACK/NACK) message, a channel quality indicator (CQI), multiple-input-multiple-output (MIMO) feedback such as a rank indicator (RI) or a precoding matrix indicator (PMI), a scheduling request for uplink transmission, and so forth. The end-user device 102 can transmit using, for instance, binary phase-shift keying (BPSK) or quadrature phase-shift keying (QPSK) for PUCCH modulation.

The base station 104 can transmit control information to the end-user device 102 via a physical downlink control channel (PDCCH) 206. The PDCCH 206 can be used by the base station 104 to communicate downlink control information (DCI) and/or Radio Resource Control (RRC) information to the end-user device 102. In some scenarios, the DCI includes identification of resource elements to be used for communication of data to the end-user device 102. The DCI may also include a modulation scheme and coding/decoding information for the end-user device 102 to access the data communicated to the end-user device 102.

The end-user device 102 may send data to the base station 104 via a physical uplink shared channel (PUSCH) 208. The PUSCH 208 includes radio resource control (RRC) communications, uplink control information (UCI) messages, application data, and so forth. The PUSCH 208 is typically the channel on which application or general communication data is transmitted from the end-user device 102 to the base station 104. Alternatively or additionally, the base station 104 may send data to the end-user device 102 via a physical HARQ indicator channel (PHICH) 210. The PHICH 210 includes acknowledgements or lack of acknowledgements for data received from the end-user device 102 via the PUSCH 208.

In some aspects of emergency communication with a wireless system, the end-user device 102 may transmit a communication 202 that is associated with an emergency indication 212. The emergency indication 212 thus indicates that the communication 202 is associated with an emergency situation. The emergency indication 212 can be implemented using, for example, a set of digits dialed by an end user (e.g., "911" in North America). Additionally or alternatively, the emergency indication 212 can be implemented using a code, flag, or other value included in (e.g., tagged by or appended to) the communication 202. Further, the emergency indication 212 can be realized as a category of connection or association between the end-user device 102 and the base station 104 with the category corresponding to an emergency.

Example Components and Techniques

Figure 3:
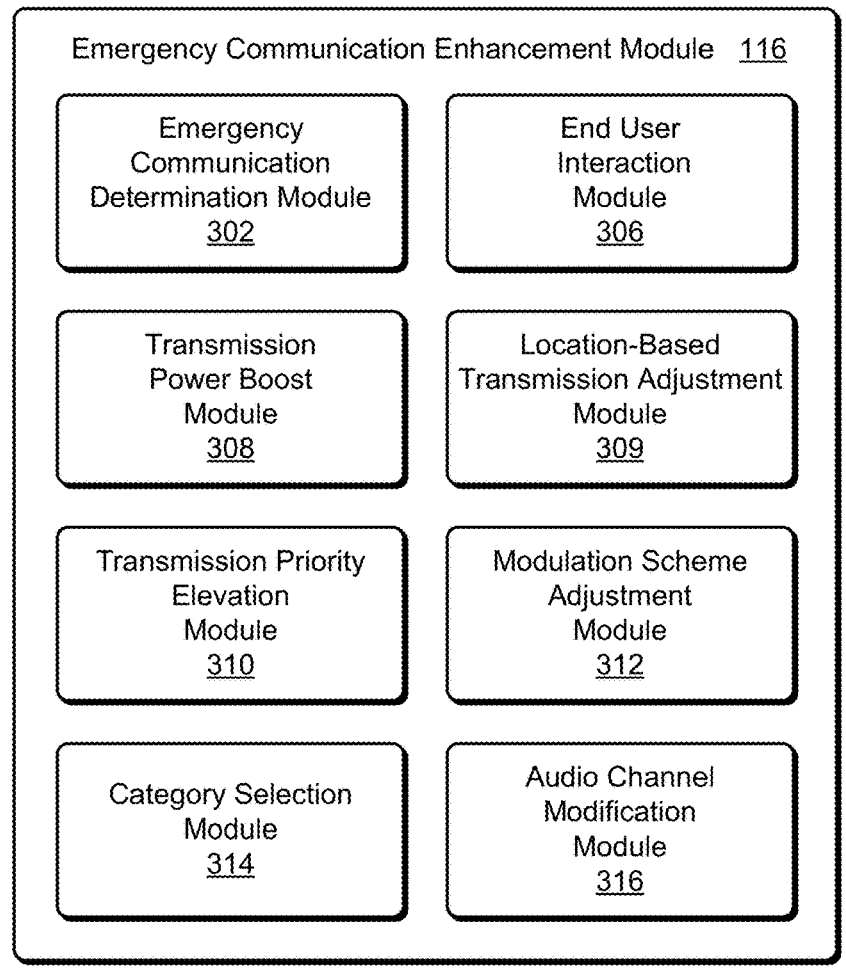
FIG. 3 illustrates examples of emergency communication enhancement modules that can be implemented by an end-user device or a base station.
Figure 3:
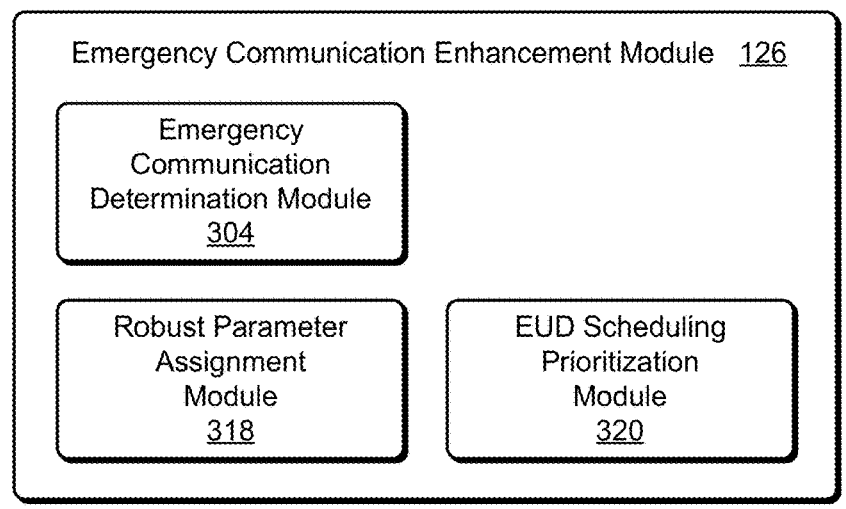

FIG. 3 illustrates examples of emergency communication enhancement modules that can be implemented by an end-user device 102 or a base station 104. The end-user device 102 (e.g., of FIG. 1 or 2) can implement the emergency communication enhancement module 116. The base station 104 (e.g., of FIG. 1 or 2) can implement the emergency communication enhancement module 126. Each enhancement module can include one or more of the illustrated modules. Each individual module can include instructions (e.g., a program or code) that are stored in at least one computer-readable storage memory and that are executable by one or more processors. The modules can be distributed across different memories and/or executed by one or multiple processors.

Figures 1, 10:
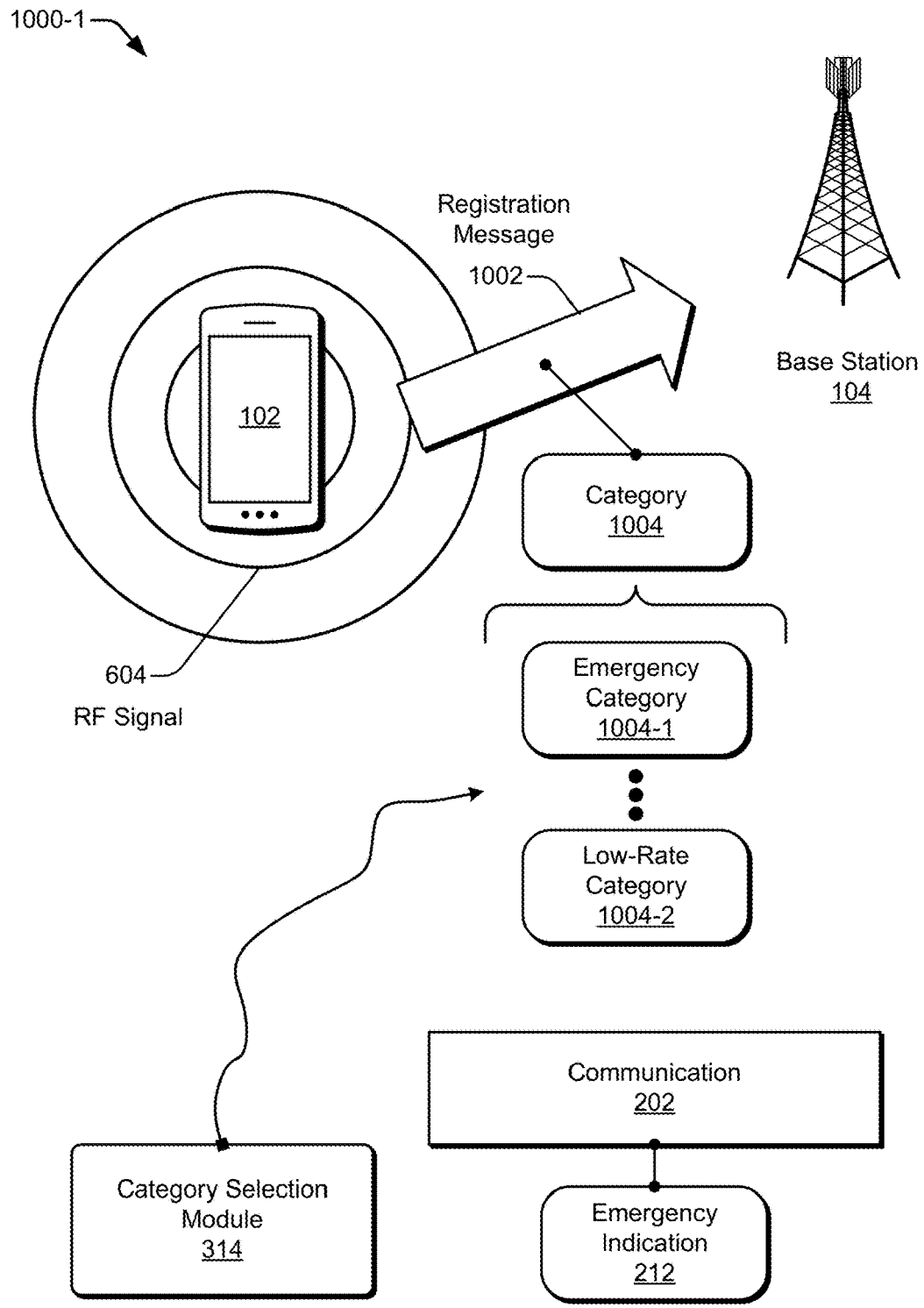
Figures 2, 10:
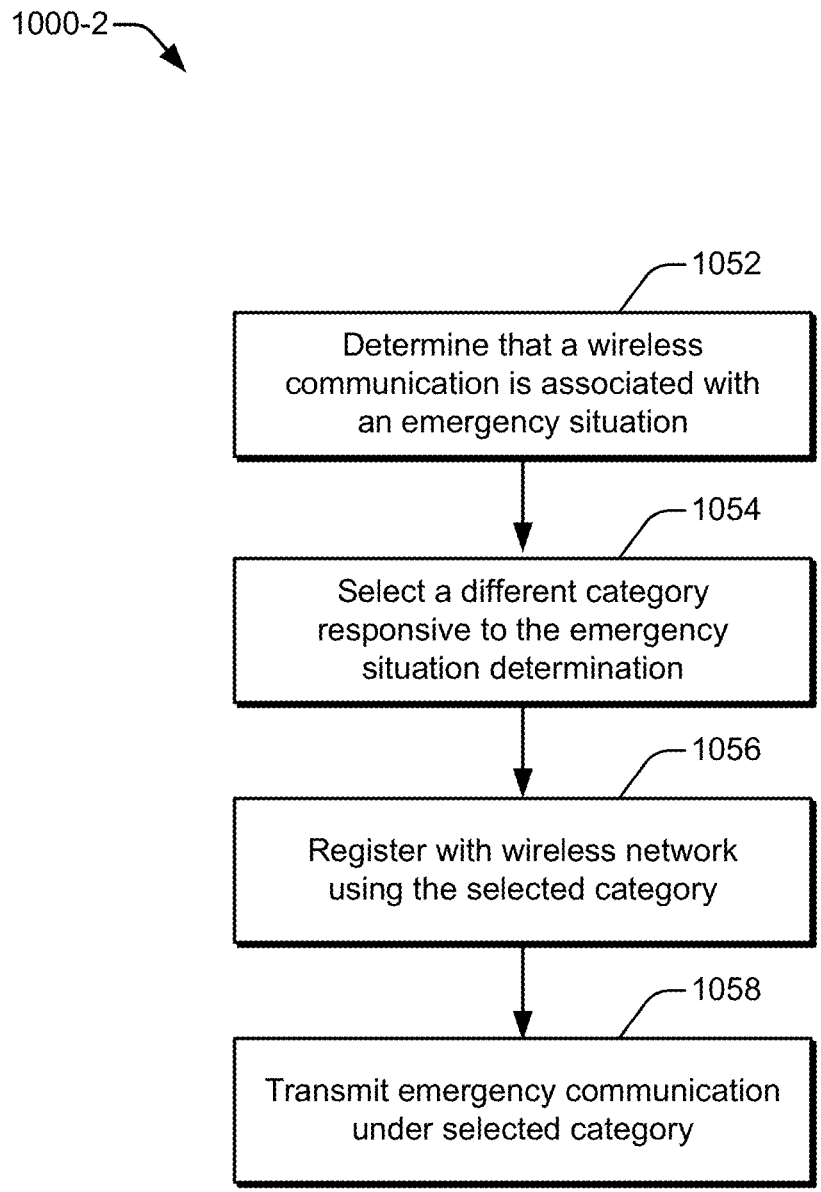
Figures 1, 11:
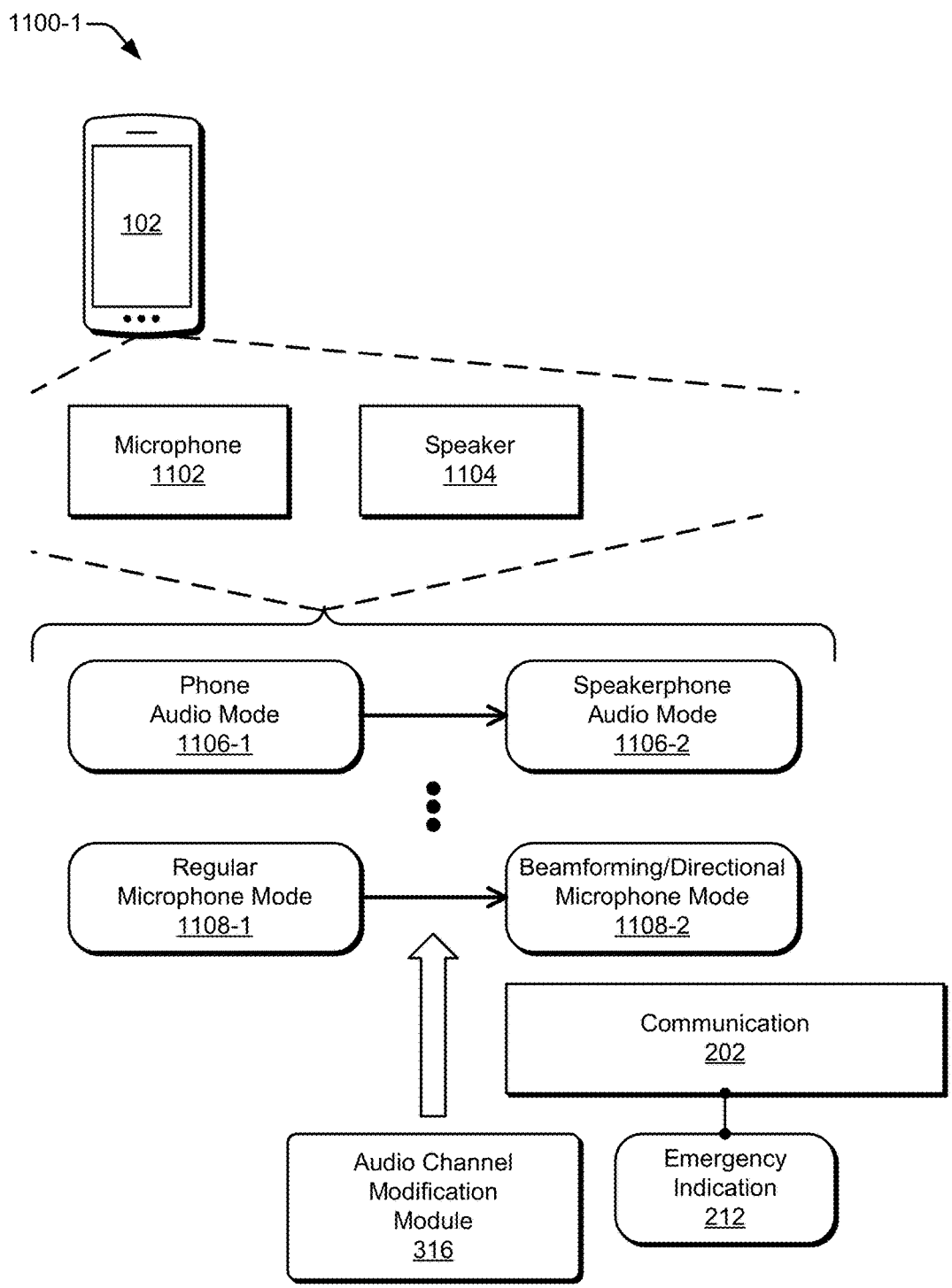
Figures 2, 11:
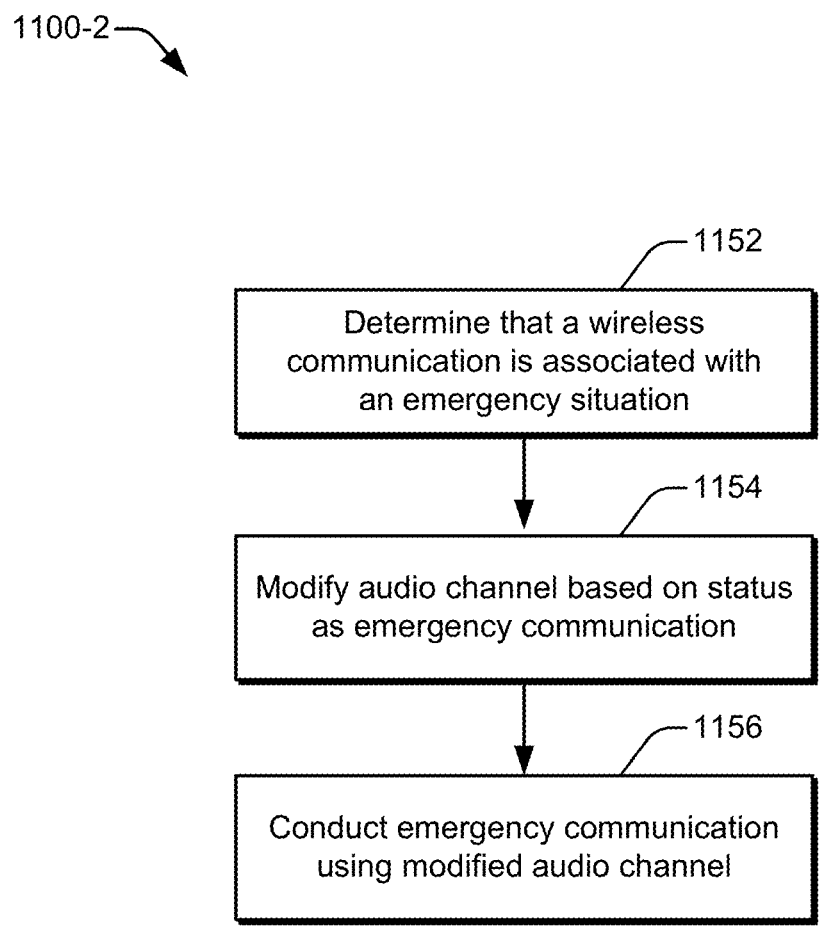

As illustrated, the emergency communication enhancement module 116 of an end-user device 102 includes one or more modules: an emergency communication determination module 302 (e.g., described with reference to FIG. 4), an end-user interaction module 306 (e.g., described with reference to FIGS. 5-1 and 5-2), a transmission power boost module 308 (e.g., described with reference to FIGS. 6-1 and 6-2), a location-based transmission adjustment module 309 (e.g., described with reference to FIGS. 7-1 and 7-2), a transmission priority elevation module 310 (e.g., described with reference to FIGS. 8-1 and 8-2), a modulation scheme adjustment module 312 (e.g., described with reference to FIGS. 9-1 and 9-2), a category selection module 314 (e.g., described with reference to FIGS. 10-1 and 10-2), or an audio channel modification module 316 (e.g., described with reference to FIGS. 11-1 and 11-2). Also, the emergency communication enhancement module 126 of a base station 104 includes one or more modules: an emergency communication determination module 304 (e.g., described with reference to FIG. 4), a robust parameter assignment module 318 (e.g., described with reference to FIG. 12), or an end-user device (EUD) scheduling prioritization module 320 (e.g., described with reference to FIG. 12). Example implementations of these individual modules are described below.

This disclosure includes descriptions of various methods for implementing emergency communication in a wireless system with reference to associated flow diagrams (e.g., FIGS. 4, 5-2, 6-2, 7-2, 8-2, 9-2, 10-2, 11-2, 13, and 14). The orders in which operations of these methods are shown and/or described are not intended to be construed as a limitation, for any number or combination of the described method operations can be combined in any order to implement a method, or an alternative method. Further, described operations can be implemented in fully or partially overlapping manners. These methods can be implemented utilizing the example hardware and systems described herein.

Figure 4:
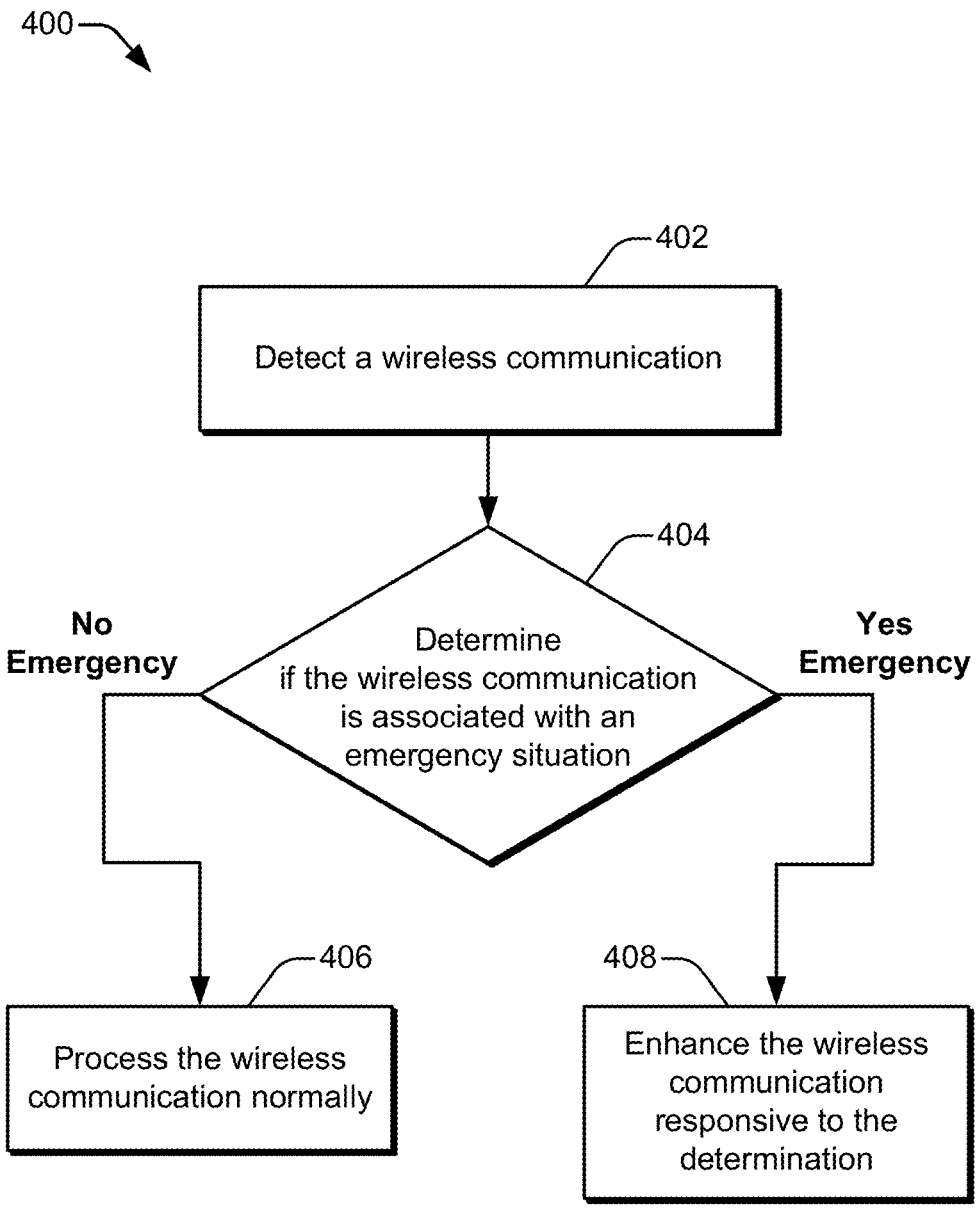
FIG. 4 illustrates example methods for emergency communication in a wireless system as described herein.

FIG. 4 illustrates example methods 400 for emergency communication in a wireless system as described herein. The method 400 includes blocks 402-408. The method 400 can be performed by an emergency communication determination module 302 of an end-user device 102 or by an emergency communication determination module 304 of a base station 104 (e.g., of FIGS. 1-3). At block 402, a wireless communication is detected. For example, a wireless communication 202 can be detected as a mobile-originated (MO) or a mobile-terminated (MT) communication. The wireless communication can be an incoming communication that has been received or an outgoing communication that is to be transmitted over an air interface between the end-user device 102 and the base station 104.

At block 404, whether the wireless communication is associated with an emergency situation is determined. For example, for a received wireless communication 202 that is mobile-originated (MO), a base station device 104 can determine if the wireless communication 202 is associated with an emergency indication 212 based on a destination number, a communication category, a communication type appended to the communication, and so forth. For a wireless communication 202 that is to be transmitted from an end-user device 102, a device can determine if the wireless communication 202 is associated with an emergency situation based on a number entered by an end user, based on a physical or virtual emergency button being pressed by an end user, based on an emergency status being selected via a user interface (UI) feature (e.g., with a slider switch or menu option), and so forth.

As another example, for a wireless communication 202 that is mobile-terminated (MT), a base station device 104 can determine that the wireless communication 202 is associated with an emergency indication 212 based on an indication from an authority, such as government or regulatory authority. For instance, a government entity may instruct that a wireless communication 202 is to be broadcast to multiple end-user devices within a given area using an enhanced emergency scheme as described herein, such as for a natural disaster or a terrorist event. Alternatively, a government entity may instruct that a wireless communication 202 is to be transmitted to a specific one end-user device (or a specific few end-user devices) possessed by a particular person, such as an off-duty officer or agent that needs to be reached.

If there is no associated emergency situation (as determined at block 404), then at block 406 the wireless communication is processed normally. On the other hand, if there is an emergency situation associated with the wireless communication, then at block 408 the wireless communication is enhanced responsive to the determination. For example, an end-user device 102 or a base station 104 can enhance the wireless communication 202 to increase a likelihood that the wireless communication 202 is successfully instituted between an originating device and a destination device. Multiple different enhancement schemes, which can be used separately or in any combination, are described below.

Figures 1, 5:
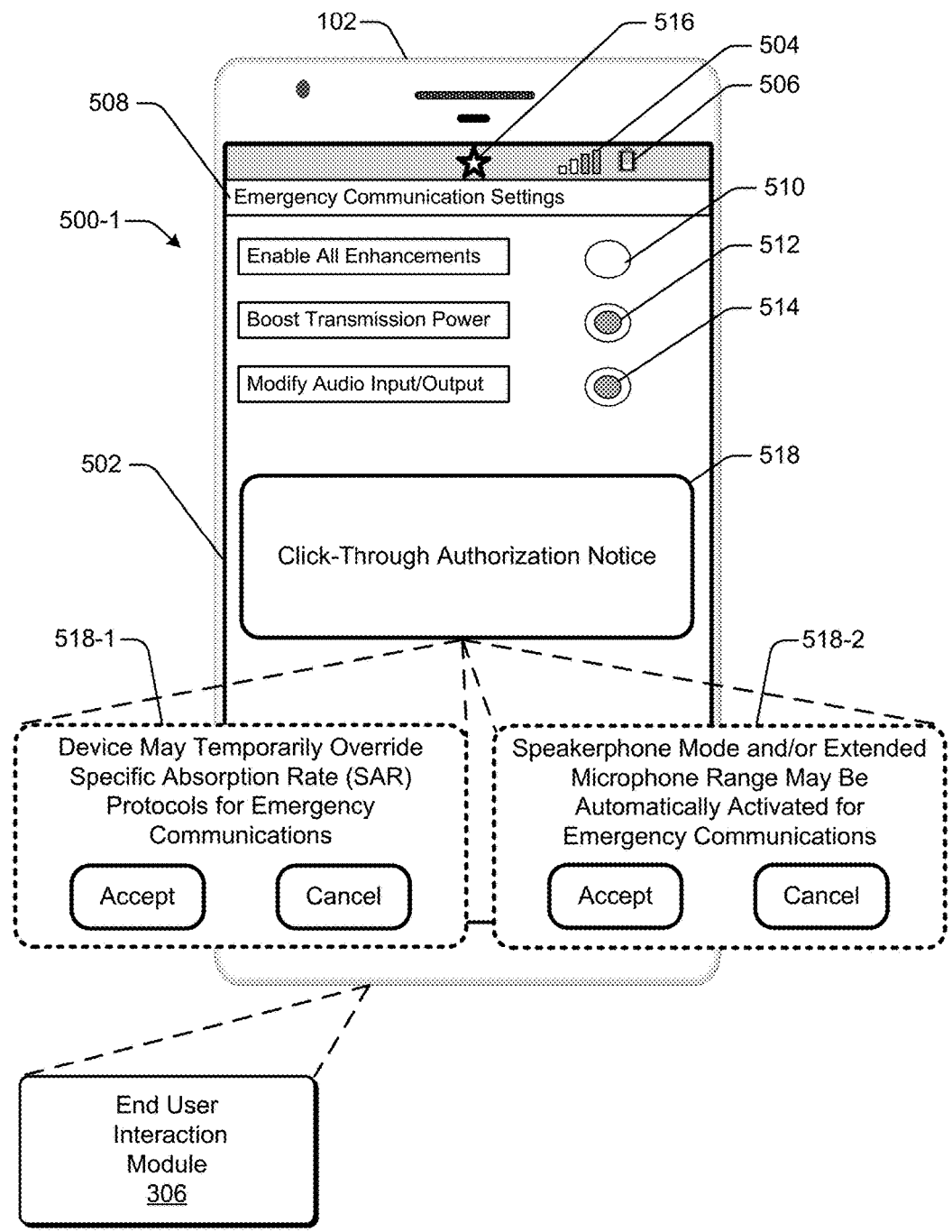
Figures 2, 5:
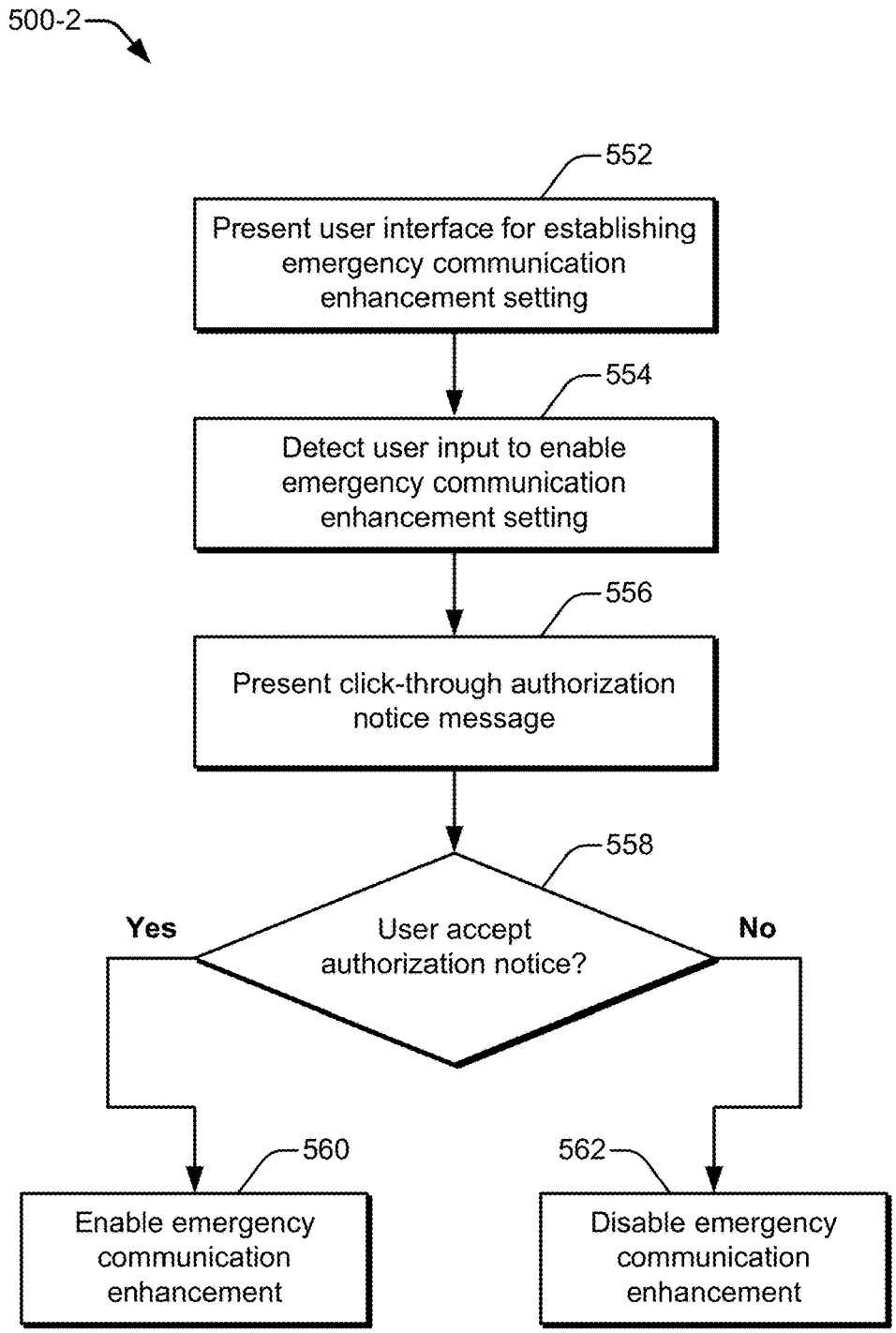

FIG. 5-1 illustrates example schemes for implementing end-user interaction with emergency communications in a wireless system. Thus, FIG. 5-1 depicts an example user interface 500-1 of the end-user device 102 through which one or more aspects of emergency communication in a wireless system may be implemented. The end-user interaction module 306 can implement (e.g., create, realize, display, or detect user interaction with) the user interface 500-1. In this example, the user interface 500-1 is presented through a visible portion of a display 502 for providing output to an end user. The display 502 may also include, or be integrated with, a touch screen or touch-sensitive overlay for receiving touch input from the user. The display 502 may also display a signal-quality state indicator 504 of the end-user device 102 and/or a battery state indicator 506 of the end-user device 102.

In some cases, the display 502 provides or makes accessible a settings menu 508 through which the user interface 500-1 can receive input to select if emergency communication enhancement is enabled and, if so, which individual types of emergency communication enhancement schemes are enabled. Thus, a settings menu 508 for device and/or emergency communication authorizations can receive a user selection to enable one or more schemes, such as those provided by the modules of FIG. 3. The emergency communication settings menu 508 can be presented when a phone is first turned on or after major updates, when a user first signs into an operating system, when a user first launches a phone or dialing application, when a user attempts to make an emergency communication, on-demand from a settings application, and so forth.

The selection of one or more schemes can be effective to enable, via the emergency communication enhancement module 116, one or more of the emergency communication enhancement schemes described herein. Two examples schemes are explicitly shown, but more, fewer, or different schemes can be presented via the display 502. A menu entry 510 is labeled "Enable All Enhancements." Activation of the menu entry 510 activates each of the entries listed below and therefore enables each of the associated schemes. A menu entry 512 is labeled "Boost Transmission Power." Activation of the menu entry 512 enables transmission power to be temporarily boosted by the transmission power boost module 308 (of FIG. 3), which is described below with reference to FIGS. 6-1 and 6-2. A menu entry 514 is labeled "Modify Audio Input/Output." Activation of the menu entry 514 enables audio channels to be automatically modified by the audio channel modification module 316 (of FIG. 3), which is described below with reference to FIGS. 11-1 and 11-2. An on/off button is implemented to activate each menu entry. However, another UI feature, such as a slider switch, can be used instead.

In some implementations, an emergency communication enhancement indicator 516 can be presented to indicate to the user that at least one enhancement scheme has been enabled. The emergency communication enhancement indicator 516 can be displayed constantly if a scheme has been enabled, can be displayed when a related communication application (e.g., a phone or dialer application) is active, can be displayed in response to an emergency communication being initiated or in-progress (e.g., after being determined as in block 404 of FIG. 4), can be displayed constantly but emphasized (e.g., via blinking) if an emergency communication is initiated or in-progress, some combination thereof, and so forth.

Alternately or additionally, an authorization notice 518 can be provided via the user interface 500-1 to indicate that an emergency communication enhancement is being enabled. An authorization notice 518 can be provided upon enabling a corresponding enhancement scheme and/or at a time the scheme is being used (e.g., when an emergency communication is occurring—such as being initiated or being in-progress). As shown, the notice is presented as a click-through authorization notice 518 that an end-user is obligated to click on before proceeding. The authorization notice 518 can serve as a warning, explanation, or description of the enhancement scheme for the end user. Two examples are shown, both with an "accept" option and a "cancel" option. An example authorization notice 518-1 reads: "Device May Temporarily Override Specific Absorption Rate (SAR) Protocols for Emergency Communications." An example authorization notice 518-2 reads: "Speakerphone Mode and/or Extended Microphone Range May Be Automatically Activated for Emergency Communications." However, an authorization notice 518 may include alternative language that is enabled with a scroll bar (e.g., to facilitate clarity, to provide more details, or to enable an end-user to obtain more information—such as with a link or another button leading to additional explanation).

The authorization notice 518 is illustrated in this example as a pop-up notification in the display 502; however, other forms of notification may be implemented in addition or in alternative to the visual pop-up notification. For example, the end-user device 102 may provide an audible notification (e.g., a sound or a recorded/automated message), a visible notification via an LED indicator that is separate from the display 502, or a motion-based notification such as a vibration of the end-user device 102.

FIG. 5-2 illustrates example methods 500-2 for implementing end-user interaction. The end user interaction module 306 (e.g., of FIGS. 3 and 5-1) can implement the methods. At block 552, a user interface is presented for establishing emergency communication enhancement settings. For example, a user interface module 118 (of FIG. 1) of an end-user device 102, in conjunction with an end-user interaction module 306 (e.g., of FIGS. 3 and 5-1), can present a user interface 500-1 that includes an emergency communications settings menu 508 having one or more menu entries. At block 554, a user input to enable an emergency communication enhancement setting is detected. For example, the end-user interaction module 306 can detect activation of an on/off button or a slider associated with an emergency communication enhancement scheme.

At block 556, a click-through authorization notice message is presented. For example, an authorization notice 518 can be presented on a display 502. At block 558, if an end user accepts the authorization notice to approve or authorize enablement of the corresponding emergency communication enhancement is determined. For example, the end-user interaction module 306 can determine if the end user clicks on an "accept" or a "cancel" virtual button. At block 560, the emergency communication enhancement is enabled if the end user accepts the authorization notice. However, at block 562, the emergency communication enhancement is disabled (e.g., turned or kept off) if the end user does not accept the authorization notice.

Figures 1, 6:
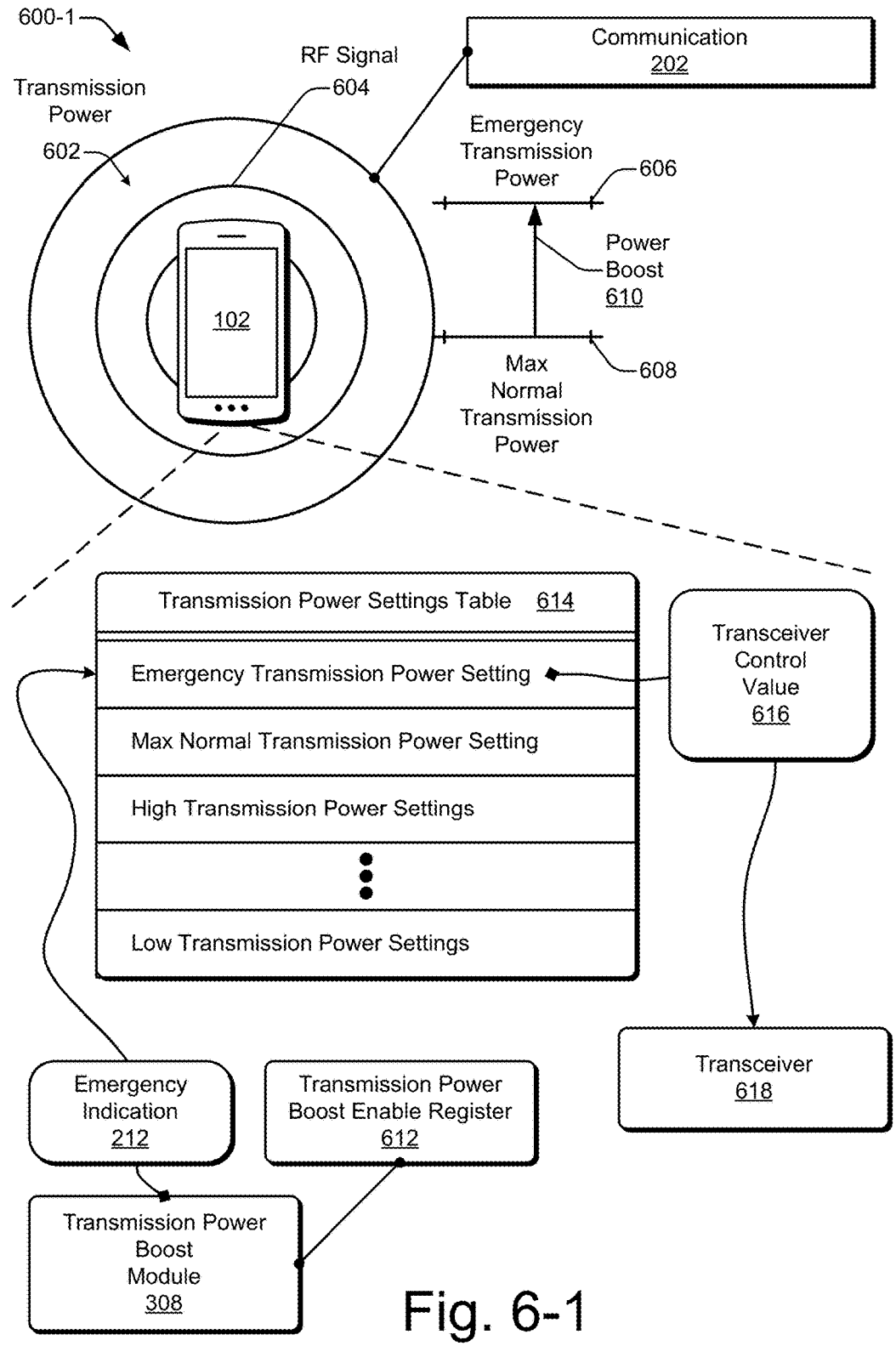
Figures 2, 6:
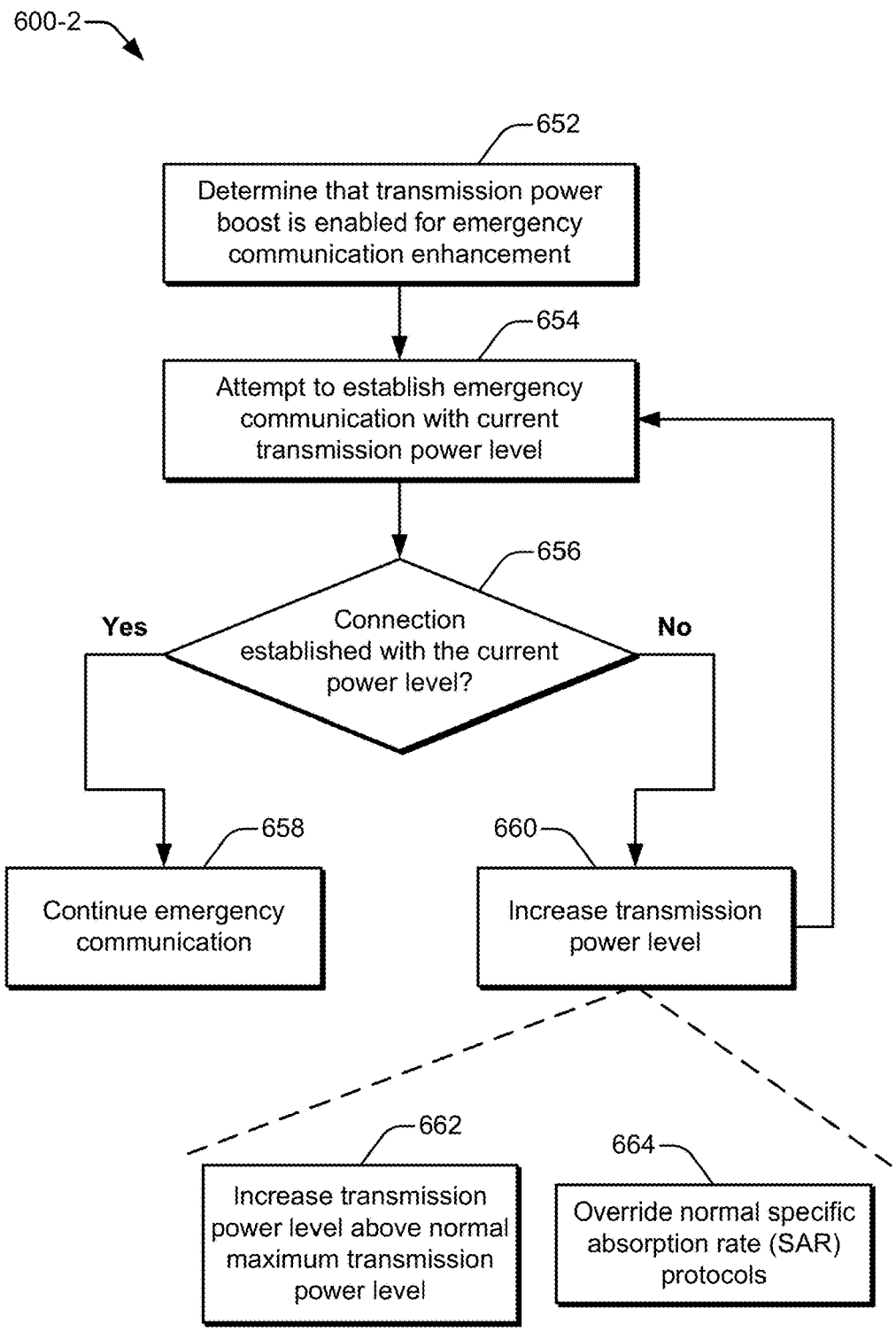

FIG. 6-1 illustrates example schemes 600-1 for implementing transmission power boosting. A transmission power boost module 308 can implement the schemes 600-1. As shown, an end-user device 102 is transmitting a radio frequency signal 604 (RF signal) for a communication 202 at some transmission power 602. The end-user device 102 can vary the transmission power 602 based on different environmental factors, such as temperature, distance to a destination device, locally-measured SNR, feedback on SNR measured at a base station, noise level, interfering structures, and so forth. In a normal situation, the end-user device 102 operates with a maximum normal transmission power 608. The maximum normal transmission power 608 can be set by government regulation, industry standards, network provider specifications, and so forth. Additionally or alternatively, the maximum normal transmission power 608 can be set based on cellular network planning factors, specific absorption rate (SAR) protocols, safety concerns, a status of a device power source, and so forth.

However, in accordance with certain principles described herein, the transmission power 602 can be temporarily boosted above the maximum normal transmission power 608 responsive to a communication being associated with an emergency situation. As illustrated, a power boost 610 can increase the transmission power 602 from the maximum normal transmission power 608 to an emergency transmission power 606.

In an example wireless system, the maximum normal transmission power 608 can be approximately 23 dBm (e.g., in terms of total radiated power (TRP)). In some implementations, the power boost 610 can range from approximately 1 dBm to 3.5 dBm. Thus, the emergency transmission power 606 can range from approximately 24 dBm to 26.5 dBm. In some scenarios, the power boost 610 corresponds to a transmission power delta that increases the transmission power 602 above an actual prescribed maximum (such as one promulgated by the Federal Communications Commission (FCC)). In other scenarios, the power boost 610 corresponds to headroom between the maximum normal transmission power 608 that is programmed for the device (e.g., to ensure compliance across environmental factors, frequency band, or process/manufacturing differences) and a calibrated maximum based on a TRP that is set to the prescribed maximum.

In example implementations, the end-user device 102 includes a transmission power boost enable register 612, a transmission power settings table 614, and a transceiver 618. An indication value stored in the transmission power boost enable register 612 is set based, for instance, on the menu entry 512 of FIG. 5-1. If the transmission power boost enhancement is enabled, the transmission power boost module 308 can boost the transmission power 602 if the communication 202 of the RF signal 604 is associated with an emergency indication 212.

The transmission power settings table 614 includes settings for different transmission power levels. Example levels include low, high, maximum, and emergency; however, more, fewer, or different power level settings can be included in the table. Further, a table can include multiple entries for different emergency transmission power levels or settings. Each entry in the transmission power settings table 614 includes one or more settings for the corresponding power level. Settings correspond to, for example, power amplifier gain or a supply voltage level for the transceiver 618. When looking up power settings, the end-user device 102 typically applies inputs such as temperature, frequency band, etc. to extract a corresponding power setting.

Responsive to a determination that the communication 202 is associated with the emergency indication 212, the transmission power boost module 308 accesses the transmission power settings table 614 to ascertain an emergency transmission power setting. The ascertained emergency transmission power setting can also be based on current environmental factors (e.g., temperature), frequency band, and so forth. From the ascertained emergency transmission power setting, the end-user device 102 extracts at least one transceiver control value 616 and applies the extracted transceiver control value to the transceiver 618. The end-user device 102 then transmits the communication 202 at a transmission power 602 that corresponds to the emergency transmission power 606 using the transceiver 618.

FIG. 6-2 illustrates example methods 600-2 for implementing transmission power boosting schemes. The transmission power boost module 308 (e.g., of FIGS. 3 and 6-1) can implement the methods. At block 652, the transmission power boost module 308 determines that the transmission power boost enhancement feature is enabled. For example, the transmission power boosts enable register 612 can be set with an affirmative indicator. At block 654, the end-user device 102 attempts to establish an emergency communication with a current transmission power level. At block 656, the end-user device 102 determines if a connection is established (e.g., with a base station 104) with the current power level. If so, then at block 658 the connection enables the end-user device 102 to continue the emergency communication.

If, on the other hand, a connection is not established with the current power level, then at block 660 the transmission power level is increased. To implement the operation(s) of the block 660, at block 662 the transmission power boost module 308 causes the transmission power level to be increased above a maximum normal transmission power level. Additionally or alternatively, at block 664 the transmission power boost module 308 can cause the end-user device 102 to override normal specific absorption rate (SAR) protocols for the emergency communication. For example, a normal maximum time period, instantaneous exposure level, or combination thereof can be temporarily exceeded to enable an emergency communication to be made.

In an alternative method, the operation(s) of the block 652 can instead be performed after a negative result of the determination of the block 656. With some wireless standards (e.g., CDMA), an end-user device may be programmed to automatically start at lower power levels and gradually increase until a connection is established. With other wireless standards (e.g., LTE), the transmission power boost module 308 can ensure that an emergency-transmission-power level is used after a non-emergency level fails to establish a connection. In still other implementations, an end-user device 102 can be configured to start with the emergency transmission power 606 if a communication 202 is associated with an emergency situation.

Figures 1, 7:
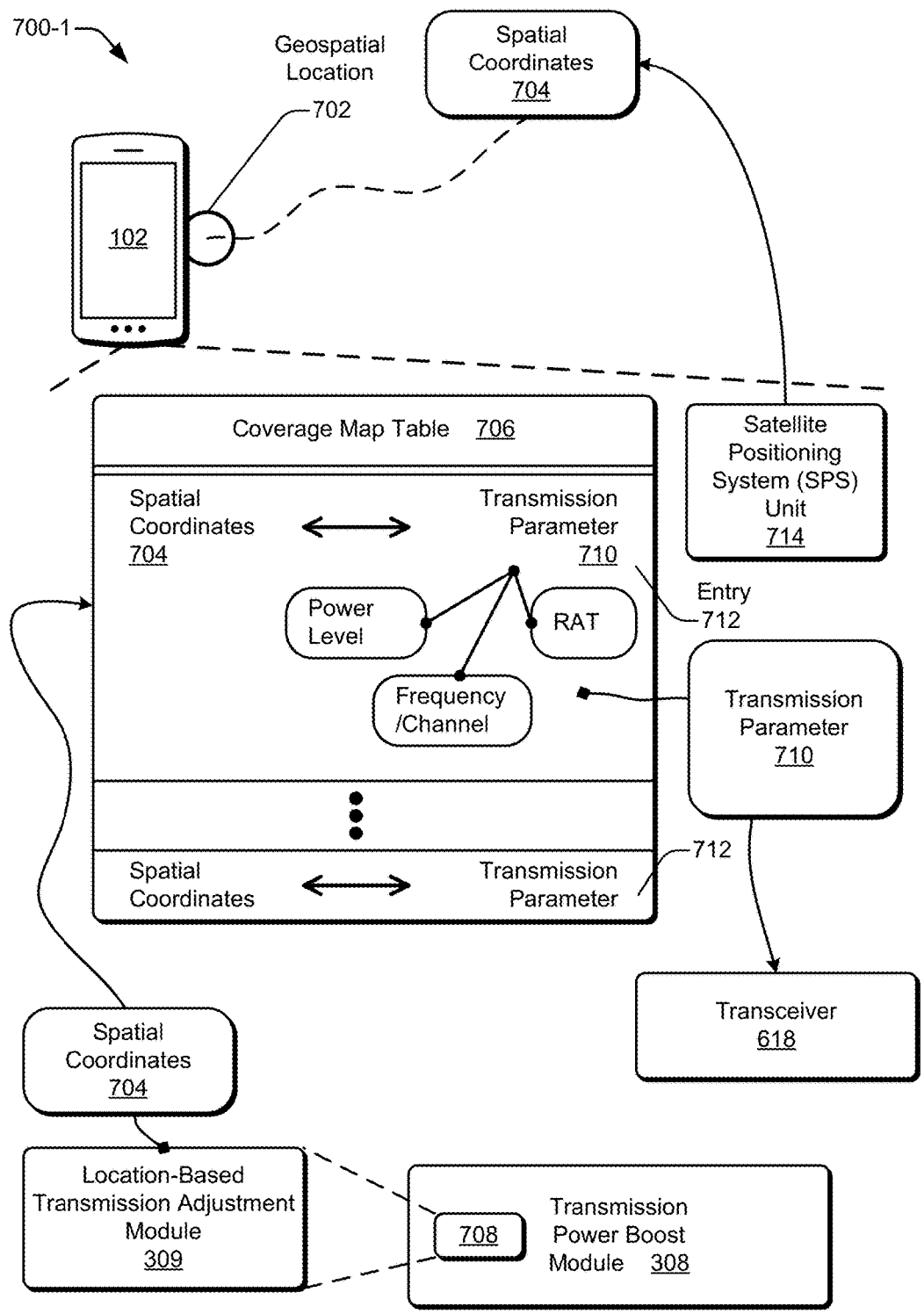
Figures 2, 7:
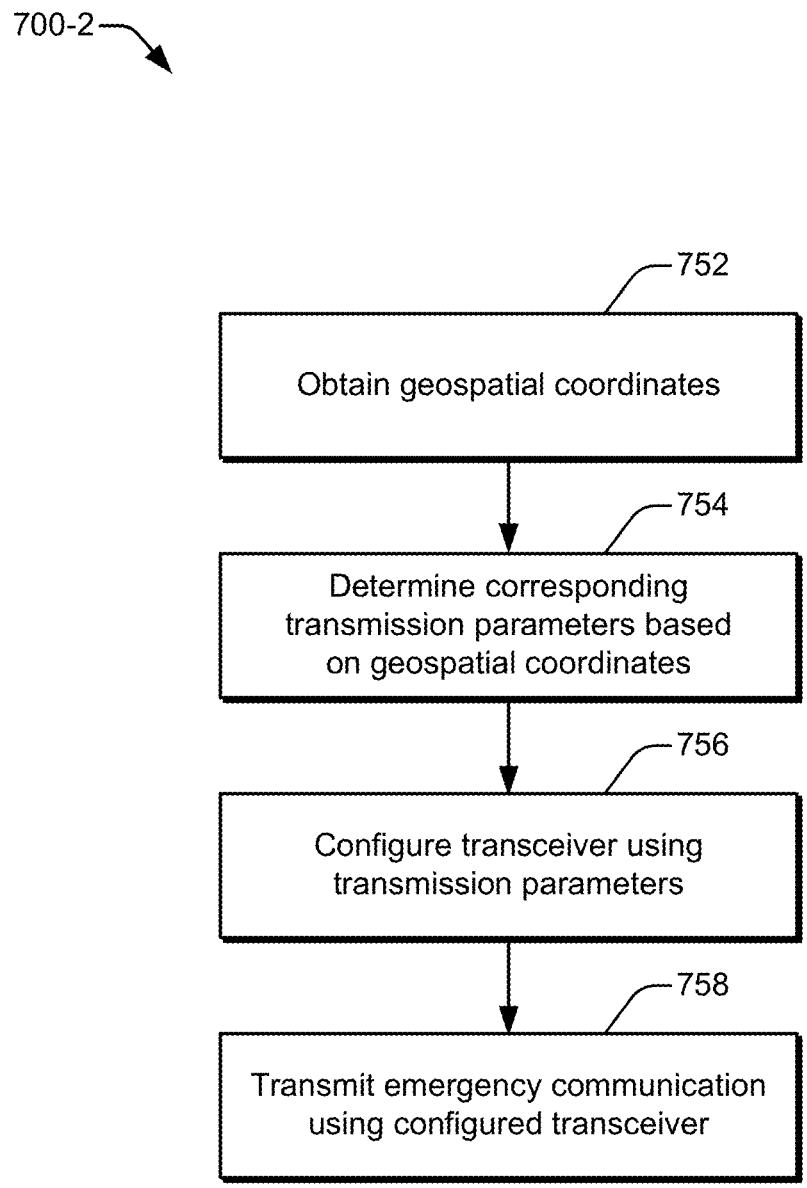

FIG. 7-1 illustrates example schemes 700-1 for implementing location-based transmission adjustment. The end-user device 102 includes a transceiver 618, a coverage map table 706, a global positioning system (GPS) unit (not shown), and a location-based transmission adjustment module 309. In some implementations, the location-based transmission adjustment module 309 is part of a transmission power boost module 308. In other implementations, the location-based transmission adjustment module 309 may be a separate or stand-alone module. The end-user device 102 is associated with a geospatial location 702. The GPS unit, or more generally a satellite positioning system (SPS) unit 714 (e.g., a global navigation satellite system (GNSS) unit), determines spatial coordinates 704 that correspond to the geospatial location 702.

The coverage map table 706 (e.g., a data structure stored in a memory) includes multiple entries 712. Each entry 712 associates at least one spatial coordinate 704 (or range or area of coordinates) with one or more corresponding transmission parameters 710. A transmission parameter 710 can include, for example, a transmission power level, a radio access technology (RAT) (e.g., W-CDMA, LTE, or 5G), a frequency or band/channel, a wireless network service provider (e.g., a company that offers cellular service for a fee), some combination thereof, and so forth.

An end-user device 102 may be positioned at some geospatial location 702 that does not offer strong coverage, including by the company to which the corresponding end user subscribes. Further, scanning to find a suitable network signal takes time. If a first attempt to make an emergency communication fails, the coverage map table 706 can be consulted to ascertain an alternative network provider, a different RAT, a lower or higher frequency, or another transmission parameter 710. Alternatively, the coverage map table 706 can be accessed to obtain at least one transmission parameter 710 prior to an initial attempt to establish a connection for an emergency communication.

FIG. 7-2 illustrates example methods 700-2 for implementing location-based transmission adjustment. The location-based transmission adjustment module 309 (e.g., of FIGS. 3 and 7-1) can implement the methods. At block 752, geospatial coordinates are obtained. For example, the SPS unit 714 can obtain geospatial coordinates 704 that represent a geospatial location 702 corresponding to the end-user device 102. At block 754, corresponding transmission parameters are determined based on the geospatial coordinates. For example, the location-based transmission adjustment module 309 can apply the spatial coordinates 704 to the coverage map table 706. An entry 712 that matches the spatial coordinates 704 is looked up to identify one or more transmission parameters 710 that correspond to the spatial coordinates 704.

At block 756, a transceiver is configured using the determined transmission parameters. For example, the location-based transmission adjustment module 309 can apply the one or more corresponding transmission parameters 710 to the transceiver 618 to prepare the transceiver 618. At block 758, an emergency communication is transmitted using the configured transceiver. For example, using the transceiver 618 that is prepared using the one or more corresponding transmission parameters 710, the end-user device 102 can transmit an emergency wireless communication 202.

Figures 1, 8:
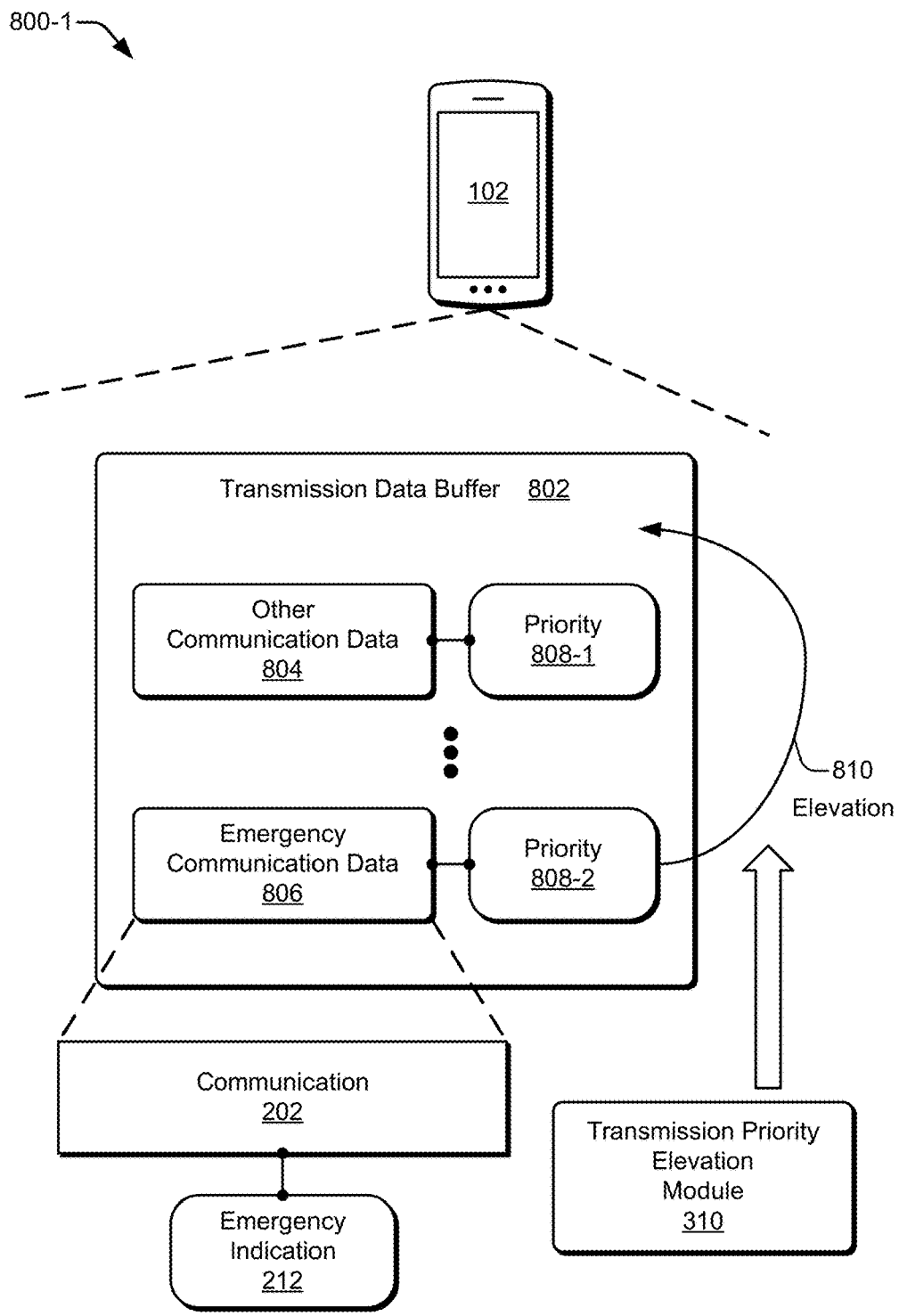
Figures 2, 8:
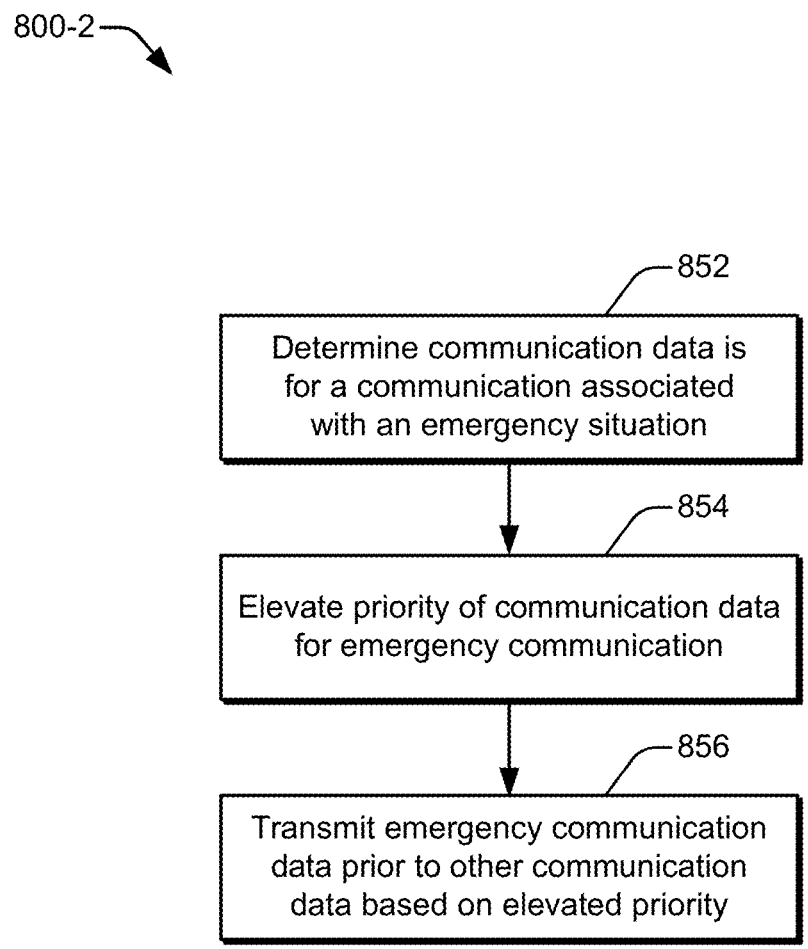

FIG. 8-1 illustrates example schemes 800-1 for implementing transmission priority elevation. The transmission priority elevation module 310 can implement the schemes 800-1. In example implementations, the transmission priority elevation module 310 increases a local priority of a wireless emergency communication 202 at the end-user device 102 to ensure that other data (e.g., background app data) is not transmitted prior to data for the wireless emergency communication 202. As shown, the end-user device 102 includes at least one transmission data buffer 802 that queues or stores data awaiting transmission from the end-user device 102 to a base station 104. The transmission data buffer 802 can be realized in one memory or distributed across multiple memories. This memory or memories may include shared system memory, dedicated communication-related memory, and so forth.

In some aspects, the transmission data buffer 802 includes multiple data portions, with each data portion associated with a respective priority (or priority level) 808. The priority 808 can comprise a value, a silo within the overall buffer, a relative ordering within the buffer, and so forth. Although the buffer can hold more or fewer data portions as indicated by the ellipses, two are explicitly shown. Other communication data 804 is associated with a priority 808-1. The other communication data 804 can correspond to, for instance, update information for a news or social media application. Emergency communication data 806 is associated with a priority 808-2. The emergency communication data 806 can correspond, for instance, to initialization or voice data for a wireless communication 202 that is associated with an emergency indication 212. Without intervention by the transmission priority elevation module 310, the priority 808-1 is greater than the priority 808-2 due to some reason in this example scenario, such as if the other communication data 804 enters the transmission data buffer 802 first. In operation, the transmission priority elevation module 310 elevates, or performs an elevation 810 on, the priority 808-2 that is associated with the emergency communication data 806 such that the priority 808-2 is above the priority 808-1.

FIG. 8-2 illustrates example methods 800-2 for implementing transmission priority elevation. The transmission priority elevation module 310 (e.g., of FIGS. 3 and 8-1) can implement the methods. At block 852, it is determined that communication data is for a communication that is associated with an emergency situation. For example, the emergency communication enhancement module 116 (e.g., the emergency communication determination module 302) can determine that a communication 202 is associated with an emergency indication 212. Consequently, corresponding emergency communication data 806 is associated with an emergency situation.

At block 854, the priority of the communication data for the emergency communication—e.g., the priority level of the emergency communication data—is elevated. For example, the transmission priority elevation module 310 can elevate the priority 808-2 for the emergency communication data 806 over that of the priority 808-1 for the other communication data 804. To do so, the transmission priority elevation module 310 can rearrange an order (e.g., physically or logically) of the data 804 or 806 within the transmission data buffer 802. Alternatively, a value of the priority 808-1 or a value of the priority 808-2 can be altered such that the priority 808-2 is then higher than the priority 808-1. For instance, the transmission priority elevation module 310 can lower a priority value of the priority 808-1 or raise a priority value of the priority 808-2 (or both). As another alternative, the transmission priority elevation module 310 can flush the transmission data buffer 802 of other communication data 804 completely or of other communication data 804 that has or would have a higher priority 808 than the priority 808-2 of the emergency communication data 806. Additionally or alternatively, the communication of background data can be temporarily disabled while there is emergency communication data 806 in the transmission data buffer 802 or while the end-user device 102 is in an emergency communication mode. At block 856, the emergency communication data is transmitted prior to other communication data based on the elevated priority. Thus, the end-user device 102 can transmit the emergency communication data 806 prior to transmitting the other communication data 804 based on the elevated priority 808-2 relative the priority 808-1.

Figures 1, 9:
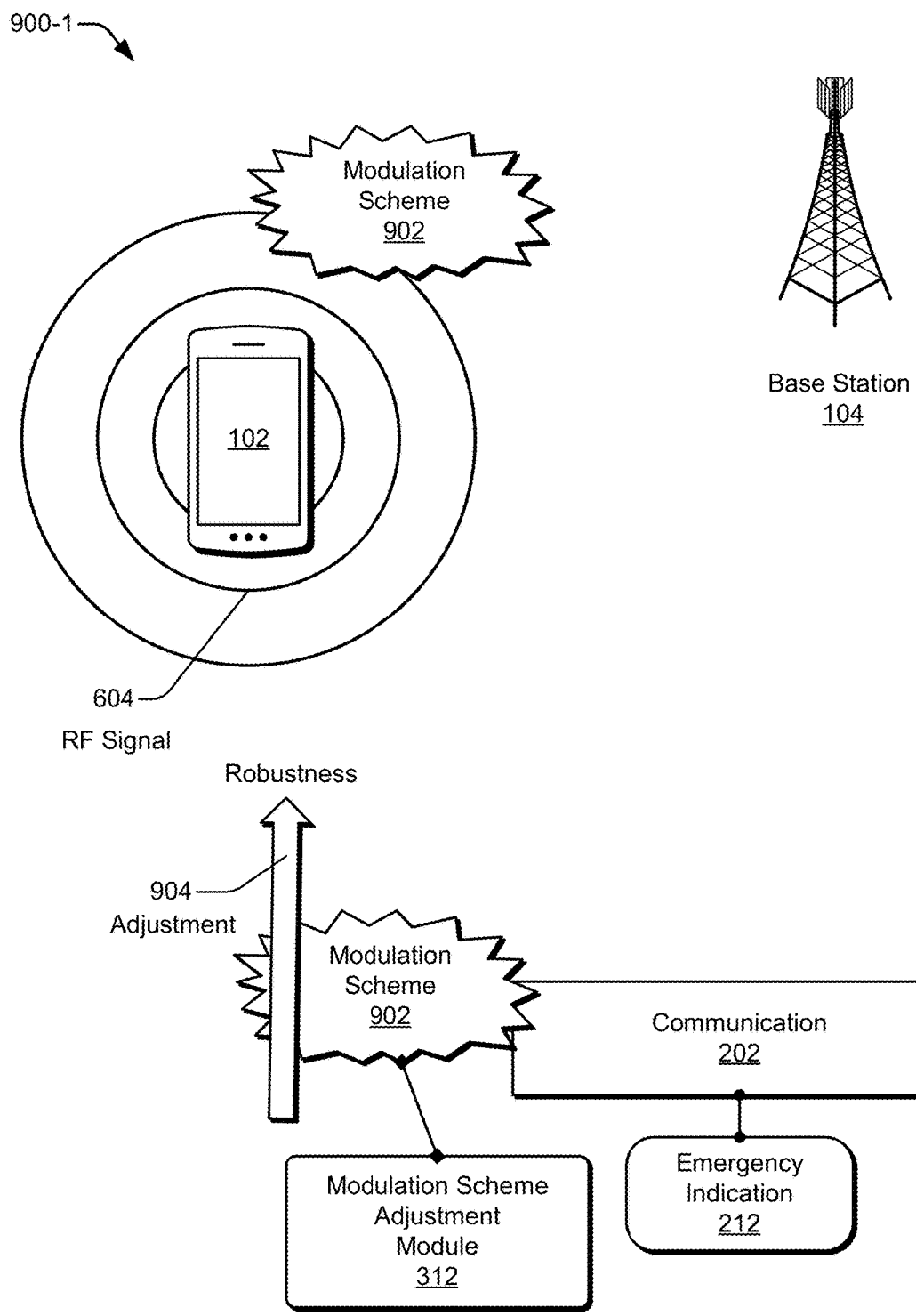
Figures 2, 9:
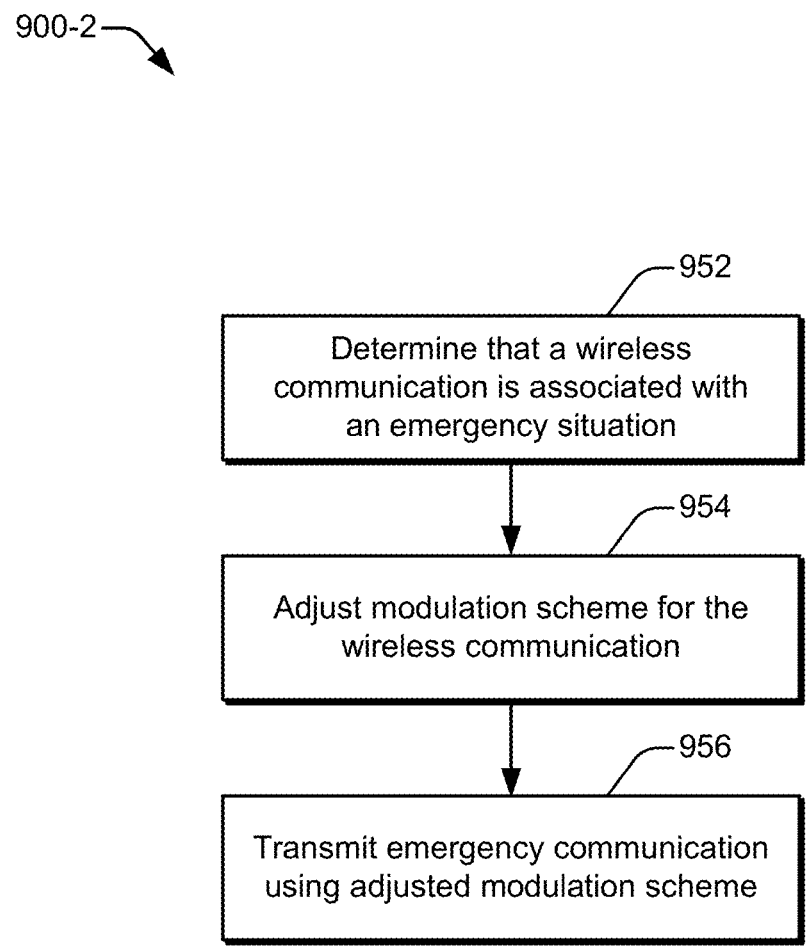

FIG. 9-1 illustrates example schemes 900-1 for implementing modulation scheme adjustment. The modulation scheme adjustment module 312 can implement the schemes 900-1. The end-user device 102 transmits the RF signal 604 for the communication 202 using some modulation scheme 902. The modulation scheme 902 determines how information for the communication 202 is encoded into the EM waves of the RF signal 604. A modulation scheme 902 may comprise, for example, a channel coding scheme, modulation coding, modulation coding scheme (MCS), and so forth.

Some modulation schemes 902 are more robust than other modulation schemes 902. In other words, a given modulation scheme 902 that is more robust than another is more likely to successfully propagate and have its information accurately demodulated/decoded at a destination device, such as the base station 104. There is often a tradeoff between robustness and bit rate. A modulation scheme 902 that is relatively more robust is likely to have a relatively lower bit rate. For example, quadrature phase-shift keying (QPSK) is more robust than 16 quadrature amplitude modulation (16-QAM), but the former has a lower bit rate than the latter.

For an emergency communication that is to transmit voice, robustness can be more important than bit rate (because with today's 3G and subsequent wireless networks, voice data can consume a relatively low bit rate as compared to video or even some web pages). Thus, in example implementations, the modulation scheme adjustment module 312 adjusts, or performs an adjustment 904, on the modulation scheme 902 to make it more robust responsive to a communication 202 being associated with an emergency situation. A modulation scheme 902 can be selected that, for instance, works successfully at a lowest SNR for a maximum range or link budget. The end-user device 102 can therefore transmit the communication 202 using the adjusted modulation scheme 902. In an example extreme scenario, the modulation scheme adjustment module 312 can drop to a most robust modulation scheme 902 that is available to the end-user device 102. In alternative implementations, other (less extreme) adjustments can be made to increase robustness. For example, a narrower frequency band can be employed for transmission so that a transmitted power is spread across fewer frequencies or a modulation scheme 902 with a medium level of robustness can be selected.

FIG. 9-2 illustrates example methods 900-2 for implementing modulation scheme adjustment. The modulation scheme adjustment module 312 (e.g., of FIGS. 3 and 9-1) can implement the methods. At block 952, an emergency communication enhancement module 116 (e.g., the emergency communication determination module 302) determines that a wireless communication 202 is associated with an emergency situation. For example, an end user may enter a phone number representing emergency services, such as "911." At block 954, a modulation scheme is adjusted for the wireless communication. For example, the modulation scheme adjustment module 312 can adjust a modulation scheme 902 to make the adjusted modulation scheme 902 more robust for a current signal environment by making symbols carried by the RF signal 604 easier to differentiate from one another. At block 956, the end-user device 102 transmits the communication 202 that is associated with the emergency indication 212 using the adjusted modulation scheme 902.

FIG. 10-1 illustrates example schemes 1000-1 for implementing category selection. The category selection module 314 can implement the schemes 1000-1. Some wireless standards define device categories, and thus some wireless systems enable devices to associate with a wireless network under at least one category. A category indicates, for example, a capability level of an end-user device. Capabilities can include power, frequency range, bandwidth, modulation scheme, available power draw, and so forth. In some systems, a category corresponds to a specific set of capabilities. In other systems, a category corresponds to a maximum or highest level of a set of capabilities.

In operation, to associate with a wireless system, the end-user device 102 can send a registration message 1002 to the base station 104. The registration message 1002 includes or otherwise indicates a category 1004 for the end-user device 102. Examples of a category 1004 include a dedicated emergency category 1004-1 and a low-rate category 1004-2. However, a given standard may define, and thus a wireless system may operate with, more types of categories. An end-user device 102 can re-register with a wireless network as, for instance, a lower-bandwidth device such that a modulation scheme is lowered automatically by the network to a modulation scheme that is more robust. In this manner, the device avoids revealing a higher range of capabilities so that a likelihood of some data being communicated, even at a lower bandwidth, is increased for the emergency communication.

In example implementations, the category selection module 314 registers with a wireless network using a category 1004 that is selected responsive to a communication 202 being associated with an emergency indication 212. Thus, the end-user device 102 can transmit to the base station 104 the registration message 1002 with an indication of, e.g., the emergency category 1004-1. With a dedicated emergency category 1004-1, an uplink can be constrained to, e.g., a QPSK modulation and a narrow frequency assignment. The narrow-frequency assignment can be realized by allocating fewer resource elements (REs), using LTE terminology. Higher transmission power can therefore be applied across a narrower frequency range, which reduces nonlinearity issues in a power amplifier of the transceiver.

However, a dedicated emergency category 1004-1 need not be used, or even available. Instead, the category selection module 314 can select a category that is generally applicable to lower-power or lower-bandwidth devices, such as Internet-of-Things devices (e.g., an electric meter or a security monitoring device). An example is the low-rate category 1004-2 in which data bandwidth is relatively lower but throughput robustness is relatively higher. In an LTE wireless network, for example, an "M0" or an "M1" category can correspond to the low-rate category 1004-2. These two categories are also intended primarily for low power scenarios. Consequently, a noticeable link budget improvement can be attained using a higher transmission power with an "M0" or "M1" category that can be achieved by some end-user devices 102, like a smart phone or dedicated emergency beacon with another category.

FIG. 10-2 illustrates example methods 1000-2 for implementing category selection. The category selection module 314 (e.g., of FIGS. 3 and 10-1) can implement the methods. At block 1052, an end-user device determines that a wireless communication is associated with an emergency situation. For example, an emergency communication enhancement module 116 (e.g., the emergency communication determination module 302) can determine that a wireless communication 202 is associated with an emergency indication 212. At block 1054, a different category of device is selected responsive to determination that the communication is for an emergency situation. For example, the category selection module 314 can select a different, non-standard, or lower device category 1004 that provides more robust propagation characteristics, even if a maximum bandwidth is lower.

At block 1056, the end-user device registers with a wireless network using the selected category. For example, to associate—or re-associate—with a wireless network, the end-user device 102 can transmit a registration message 1002 to a base station 104, with the registration message 1002 indicative of a selected category 1004. At block 1058, the emergency communication is transmitted under the selected category. For example, the end-user device 102 can transmit the wireless emergency communication 202 in accordance with the selected category 1004 to the newly or re-associated base station 104.

FIG. 11-1 illustrates example schemes 1100-1 for implementing audio channel modification. The audio channel modification module 316 can implement the schemes 1100-1. As shown, the end-user device 102 includes at least one microphone 1102 and at least one speaker 1104. In operation, the end-user device 102 is capable of using the microphone 1102 and the speaker 1104 in different audio modes 1106. Example audio modes 1106 include a phone audio mode 1106-1 and a speakerphone audio mode 1106-2. The end-user device 102 is also capable of using multiple microphones 1102 in different microphone modes 1108. Example microphone modes 1108 include a regular microphone mode 1108-1 and a beamforming (or directional) microphone mode 1108-2. Although two modes are shown, one or more than two may be included as part of an automated audio-channel-modification enhancement.

In example implementations, the audio channel modification module 316 can automatically switch the audio mode 1106 or the microphone mode 1108 responsive to a determination that a wireless communication 202 is associated with an emergency indication 212. In some aspects, the audio channel modification module 316 automatically switches from the phone audio mode 1106-1 to the speakerphone audio mode 1106-2 to increase a likelihood that an end user dealing with an emergency situation and an emergency services person can hear each other. In other aspects, the audio channel modification module 316 automatically switches from the regular microphone mode 1108-1 (e.g., which may include one microphone or two microphones for noise canceling) to the beamforming microphone mode 1108-2 in which a directional beam can be aimed to focus on particular sounds using multiple microphones. The beamforming can help an emergency services person hear if an environment is noisy, if someone is far from the microphones 1102 of the end-user device 102, or if someone is too injured to speak or to speak clearly.

In addition to an authorization granted by an end user as described above with reference to FIGS. 5-1 and 5-2 for a general enhancements settings menu, an authorization notice can be generated upon making the emergency communication—e.g., before automatically switching to another mode—which implements an affirmative opt-in approach or a timed opt-out approach before automatically switching audio channel modes. Additionally or alternatively, a UI feature that enables an end user to deactivate the speakerphone mode or another mode with one touch can be displayed during an emergency communication as part of a dialer interface of a telephone application.

FIG. 11-2 illustrates example methods 1100-2 for implementing audio channel modification. The audio channel modification module 316 (e.g., of FIGS. 3 and 11-1) can implement the methods. At block 1152, an end-user device determines that a wireless communication is associated with an emergency situation. For example, an emergency communication enhancement module 116 (e.g., the emergency communication determination module 302) can determine that a wireless communication 202 is associated with an emergency indication 212.

At block 1154, an audio channel is modified based on the communication being associated with the emergency situation. For example, the audio channel modification module 316 can automatically change an audio mode 1106 or a microphone mode 1108 of the end-user device 102 responsive to initiation of an emergency call, establishment of an emergency call, detection of inadequate sound for an emergency call for the end user or for the called party (e.g., emergency services personnel), and so forth.

At block 1156, the emergency communication is conducted using the modified audio channel. For example, an emergency call between the end user and an emergency services person can be conducted with the end-user device 102 in a speakerphone audio mode 1106-2 or a beamforming microphone mode 1108-2. With the beamforming microphone mode 1108-2, directional microphones 1102 may target a quiet voice or track one voice (e.g., from an initiating caller) during the emergency call.

Figure 12:
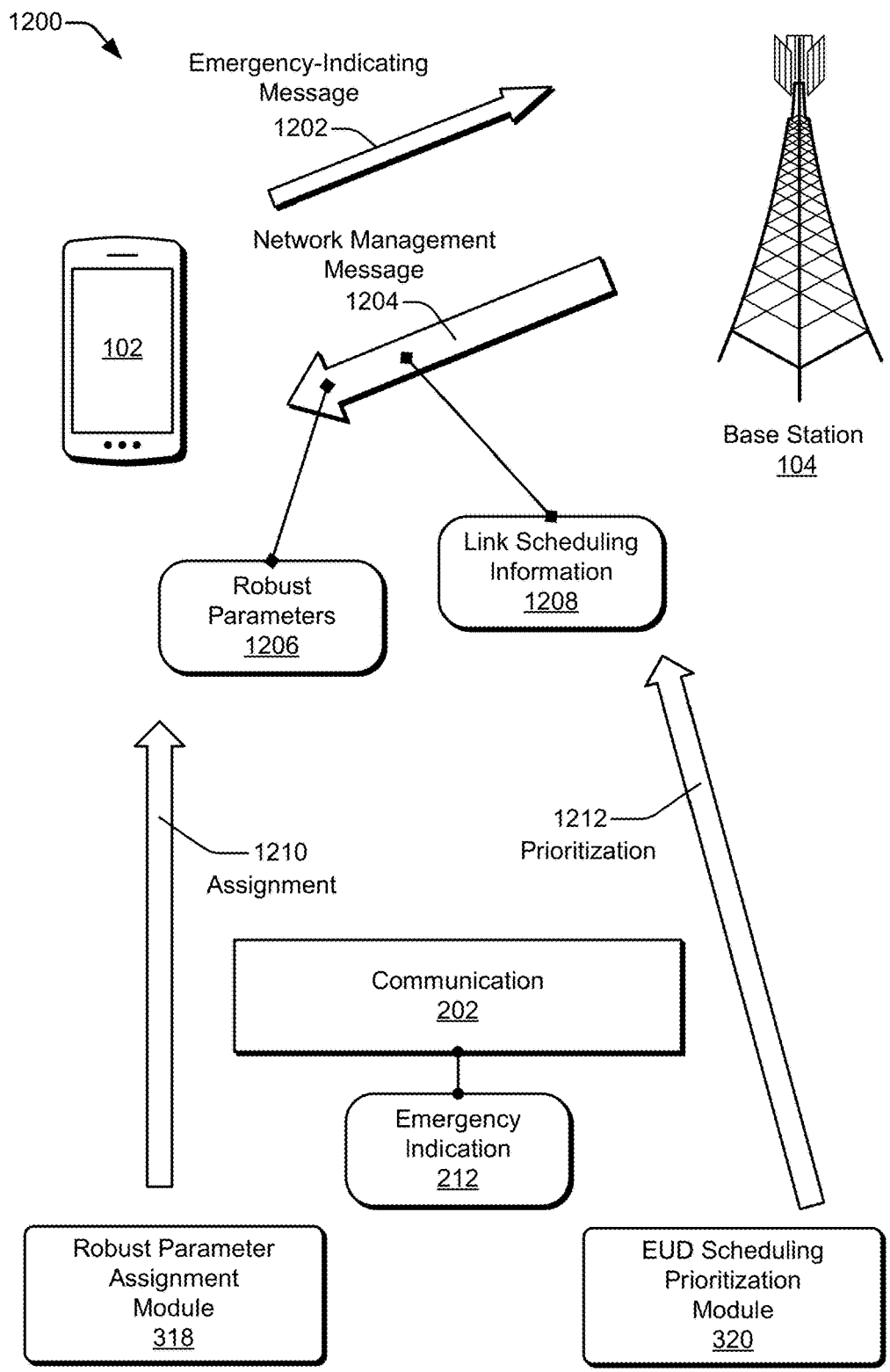
FIG. 12 illustrates example schemes for implementing emergency communication enhancement using a base station in a wireless system.

FIG. 12 illustrates example schemes 1200 for implementing emergency communication enhancement using a base station 104. The robust parameter assignment module 318 or the end-user device (EUD) scheduling prioritization module 320 can implement one or more of the illustrated schemes 1200. These two modules can work separately or together for any given communication 202 that is associated with an emergency indication 212. As illustrated, the end-user device 102 transmits, and the emergency communication enhancement module 126 of the base station 104 receives, an emergency-indicating message 1202. The indication can be implicit, such as by an emergency-designated number, or can be explicit, such as by an emergency code appended to the message 1202 or by an emergency category 1004-1 included in a registration message 1002 (both of FIG. 10). For example, using LTE terminology, a user equipment (UE) can signal entry of a transmit power boosting mode with a radio resource control (RRC) message or medium access control (MAC) elements. The emergency communication enhancement module 126 of the base station 104 analyzes the emergency-indicating message 1202 and responds accordingly.

In some implementations, the robust parameter assignment module 318 assigns robust parameters 1206 for the communication 202. The base station 104 can communicate these robust parameters 1206 to the end-user device 102 as part of a network management message 1204. The robust parameters 1206 that are assigned can include a more robust modulation scheme (e.g., QPSK), a narrower frequency assignment (e.g., one carrier or fewer carriers than a maximum that is possible in a carrier aggregation (CA) scenario), a more resilient voice codec, and so forth. Using LTE terminology, a robust parameter assignment can comprise assigning a reduced number of resource elements (REs). As described above, QPSK is a relatively simpler modulation scheme and therefore has a relatively higher level of noise immunity. More specifically, using QPSK enables a transceiver to be more tolerant to self-noise. More transmission power can therefore be used while achieving a same linearity as with other modulation schemes, which provides more link budget from floor to ceiling. Further, reducing a width of a frequency band translates to better SNR, instead of spreading signal power across a wider frequency band.

In some implementations, the EUD scheduling prioritization module 320 prioritizes the scheduling of the communication 202. The base station 104 can communicate the resulting link scheduling information 1208 to the end-user device 102 as part of a network management message 1204. Prioritizing scheduling for the end-user device 102 can include scheduling resources for the end-user device 102 prior to (earlier than) scheduling resources for other devices, scheduling resources that occur or are usable earlier than those for other devices, scheduling resources that are more robust or that are requested by the end-user device 102 in lieu of scheduling such resources for other devices, and so forth. For example, if an RF signal from the end-user device 102 is being received on one frequency band better than other frequency bands, the EUD scheduling prioritization module 320 can assign REs that correspond to the one frequency band to the end-user device 102 before considering scheduling them for other devices.

The enhancement module(s) of the base station 104 can operate independently of the end-user device 102 or in concert with the module(s) of the base station 104. For example, parameter assignment or scheduling prioritization can be performed responsive to receiving an enhancement-related message or datum from the end-user device 102, such as a registration message 1002 with an emergency category 1004-1 or a transmission power that is above a normal maximum. To operate independently, the parameter assignment or scheduling prioritization of the base station 104 can be performed responsive to detection of a standard emergency indication 212, such as a designated emergency phone number (e.g., "911").

In other example implementations, a base station 104 can provide additional network-side cooperation. For instance, the base station 104 can communicate with proximate base stations (e.g., using a wired backhaul) and ask them to lower power or fully mute themselves on one or more particular frequencies that the end-user device 102 is using for an emergency wireless communication 202. This can help the base station 104 hear the end-user device 102 that is participating in a mobile-originated (MO) emergency communication or is otherwise in a MO emergency mode.

Having generally described the environment in which techniques and apparatuses for emergency communication in a wireless system can be implemented, this discussion now turns to example methods.

Example Methods

Example methods are described herein above and below with reference to the various flow diagrams. The various methods relate to emergency communication in a wireless system. Aspects of these methods may be implemented in, for example, hardware (e.g., fixed logic circuitry), firmware, software in conjunction with hardware, or some combination thereof. These techniques may be realized using one or more of the entities or components shown in FIGS. 1-12 and 15 (an electronic device 1500 is described in FIG. 15 below), which may be further divided, combined, and so on. Thus, these figures illustrate some of the many possible systems or apparatuses capable of employing the described techniques. The entities and components of these figures generally represent firmware, hardware, IC chips, circuits, or a combination thereof.

Figure 13:
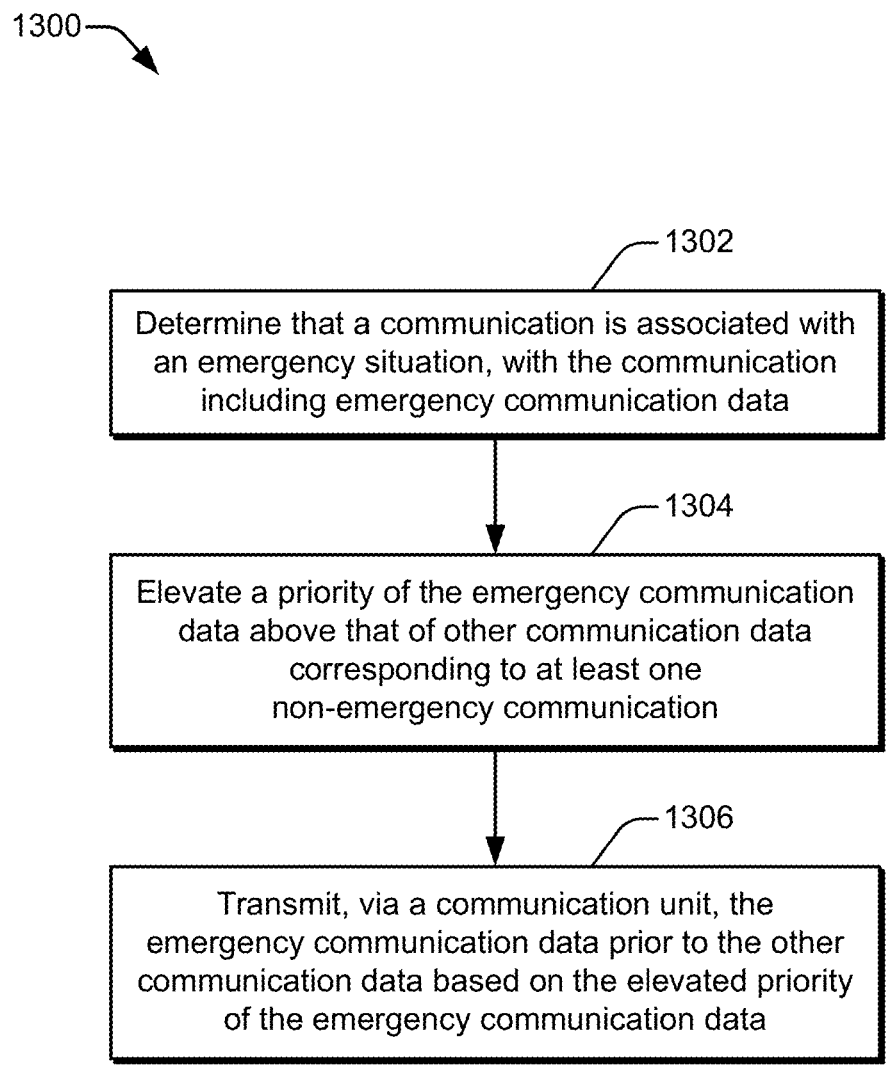
FIG. 13 illustrates example methods for implementing emergency communication in a wireless system.
Figure 14:
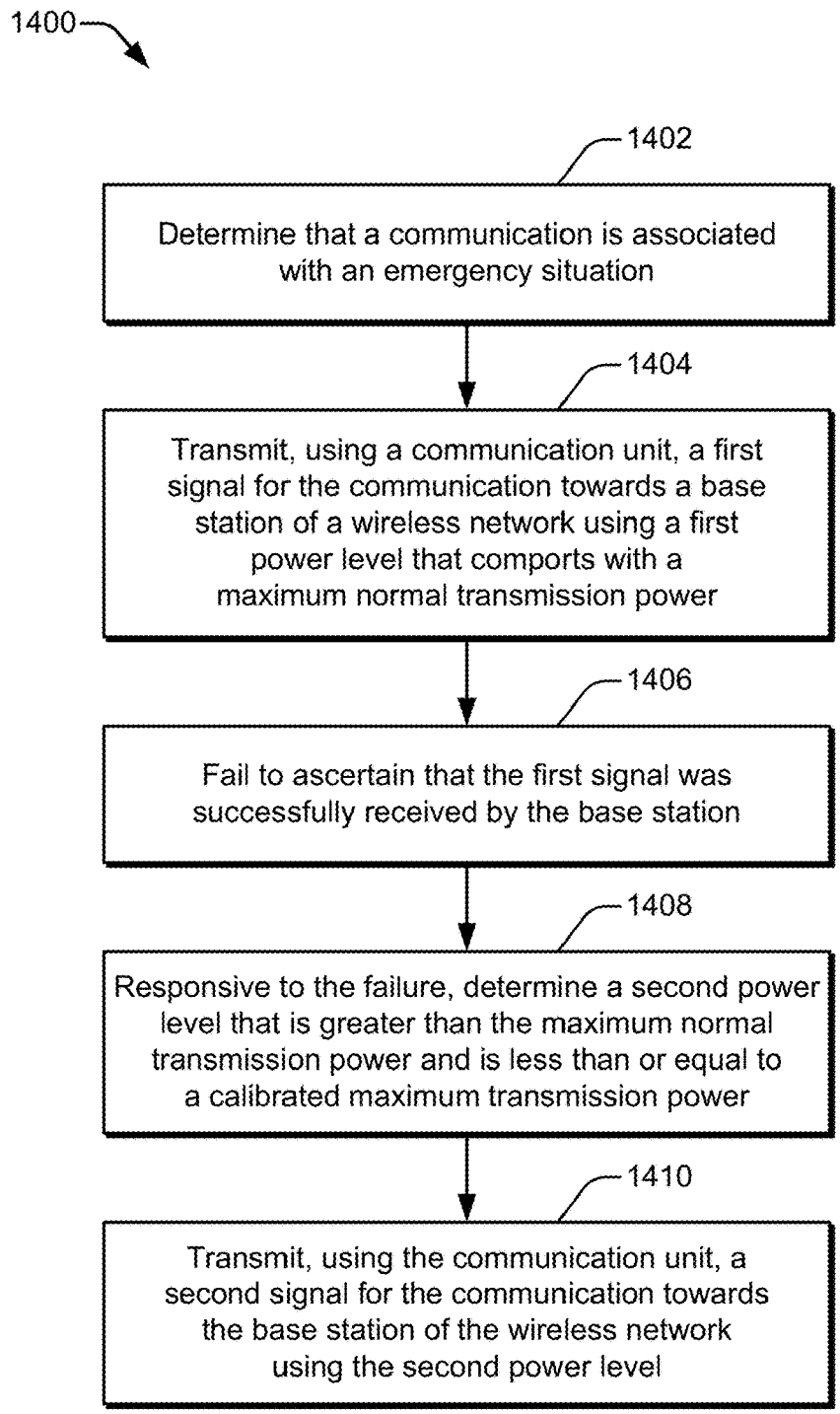
FIG. 14 illustrates other example methods for implementing emergency communication in a wireless system.

In this section, FIGS. 13 and 14 are described. Each of these figures includes a flow diagram illustrating a process having multiple operations as represented by the depicted blocks. However, the orders in which operations of these processes are shown and/or described are not intended to be construed as a limitation, for any number or combination of the described process operations can be combined in any order to implement a method, or an alternative method. Further, described operations can be implemented in fully or partially overlapping manners.

FIG. 13 illustrates example methods 1300 for implementing emergency communication in a wireless system. The emergency communication determination module 302 and the transmission priority elevation module 310 of the emergency communication enhancement module 116 (e.g., of FIGS. 1 to 4 and 8-1) can implement the methods. At block 1302, a communication is determined to be associated with an emergency situation, with the communication including emergency communication data. For example, an emergency communication determination module 302 can determine that a communication 202 is associated with an emergency situation, with the communication 202 including emergency communication data 806. The determination may be based on a destination number entered for the communication 202, detection of a physical or virtual emergency button being pressed by an end user, detection of a menu option or emergency feature activated by an end user, and so forth.

At block 1304, a priority of the emergency communication data is elevated above that of other communication data corresponding to at least one non-emergency communication. For example, a transmission priority elevation module 310 can elevate a priority 808-2 of the emergency communication data 806 above that (e.g., a priority 808-1) of other communication data 804 corresponding to at least one non-emergency communication 202. Generally, a transmission priority of emergency communication data can be raised relative to the transmission priority of other communication data. For instance, the transmission priority elevation module 310 may lower a value of the priority 808-1 of the other communication data 804, raise a value of the priority 808-2 of the emergency communication data 806, alter an order of the data in a queue (e.g., a transmission data buffer 802)—such as by moving the emergency communication data 806 ahead of the other communication data 804, pause transmission of the other communication data 804, remove the other communication data 804 from a transmission queue, some combination thereof, and so forth.

At block 1306, based on the elevated priority of the emergency communication data, the emergency communication data is transmitted prior to the other communication data via a communication unit. For example, a communication unit 120 can transmit the emergency communication data 806 prior to the other communication data 804 based on the elevated priority 808-2 of the emergency communication data 806. In some implementations, a transmitter of an end-user device 102 may wirelessly transmit the emergency communication data 806 to a base station 104 in accordance with a 5G wireless communication standard.

FIG. 14 illustrates other example methods 1400 for implementing emergency communication in a wireless system. The emergency communication determination module 302 and the transmission power boost module 308 of the emergency communication enhancement module 116 (e.g., of FIGS. 1 to 4 and 6-1) can implement the methods. At block 1402, a communication is determined to be associated with an emergency situation. For example, an emergency communication determination module 302 can determine that a communication 202 is associated with an emergency situation. Thus, an end-user device 102 may attempt to inform at least one associated base station 104 of the emergency situation using an emergency-indicating message 1202.

At block 1404, using a communication unit, a first signal for the communication is transmitted towards a base station of a wireless network using a first power level that comports with a maximum normal transmission power. For example, a transceiver 610 of a communication unit 120 can transmit a first signal (e.g., an uplink 108 on a wireless link 106) for the communication 202 towards a base station 104 of a wireless network using a first power level (e.g., a transmission power 602) that comports with a maximum normal transmission power 608.

At block 1406, attempts to ascertain that the first signal was successfully received by the base station fail. For example, a transmission power boost module 308 can fail to ascertain that the first signal was successfully received by the base station 104. For instance, an end-user device 102 may fail to receive a response from the base station 104, may be unable to correctly demodulate a signal that is received from the base station 104, may receive a signal from the base station 104 that does not include an appropriate acknowledgment (e.g., that omits an indication that an emergency situation exists, that neglects to establish a communication with the end-user device 102, etc.).

At block 1408, responsive to the failing, a second power level, which is greater than the maximum normal transmission power and is less than or equal to a calibrated maximum transmission power, is determined. For example, the transmission power boost module 308 can, responsive to the failed ascertainment, determine a second power level (e.g., another transmission power 602) that is greater than the maximum normal transmission power 608 and is less than or equal to a calibrated maximum transmission power (e.g., an emergency transmission power 606). Thus, the end-user device 102 may implement a power boost 610 to take advantage of transmit power headroom or margin that is typically employed to comport with transmission power guidelines and account for changing or unknown environmental conditions.

At block 1410, using the communication unit, a second signal for the communication is transmitted towards the base station of the wireless network using the second power level. For example, the transceiver 610 of the communication unit 120 can transmit a second signal (e.g., another uplink 108 on the wireless link 106) for the communication 202 towards the base station 104 of the wireless network using the second power level, which is higher than the first power level. If no appropriate return communication (e.g., no network management message 1204) is received and decoded, the transmission power boost module 308 may further increase the transmit power level.

Example Electronic Device

Figure 15:
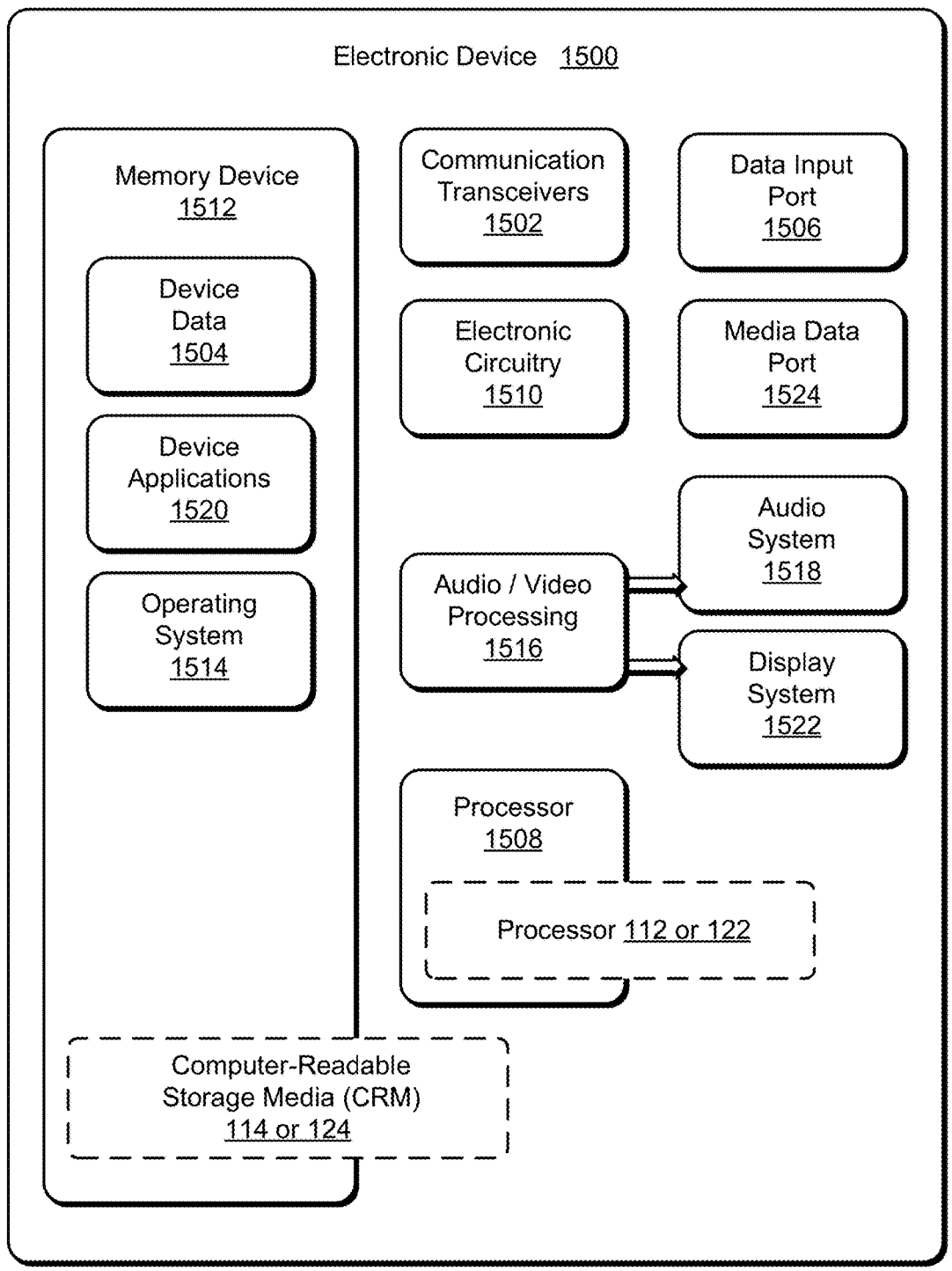
FIG. 15 illustrates various components of an example electronic device that can implement emergency communication in a wireless system in accordance with one or more implementations.

FIG. 15 illustrates various components of an example electronic device 1500 that can implement emergency communication in a wireless system in accordance with one or more implementations as described with reference to any of the previous FIGS. 1-14. The electronic device 1500 may be implemented as any one or combination of a fixed or mobile device, in any form of a consumer, computer, portable, user, server, communication, phone, navigation, gaming, audio, wearable, camera, messaging, media playback, and/or other type of electronic device or a base station device, including a cellular base station or a Wi-Fi access point.

Electronic device 1500 includes communication transceivers 1502 that enable wired and/or wireless communication of device data 1504, such as received data, transmitted data, or other information as described above. Example communication transceivers 1502 include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

The electronic device 1500 may also include one or more data input ports 1506 via which any type of data, media content, and/or other inputs can be received, such as user-selectable inputs, messages, applications, music, television content, recorded video content, and any other type of audio, video, and/or image data received from any content and/or data source. The data input ports 1506 may include USB ports, coaxial cable ports, and other serial or parallel connectors (including internal connectors) for flash memory, DVDs, CDs, and the like. These data input ports 1506 may be used to couple the electronic device to components, peripherals, or accessories such as keyboards, microphones, or cameras.

The electronic device 1500 of this example includes at least one processor 1508 (e.g., any one or more of application processors, microprocessors, digital-signal processors (DSPs), controllers, and the like), which can include a combined processor and memory system (e.g., implemented as part of an SoC), that processes (e.g., executes) computer-executable instructions stored on computer-readable media to control operation of the device. The processor 1508 may be implemented as an application processor, embedded controller, microcontroller, SoC, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other hardware.

Alternatively or additionally, the electronic device 1500 can be implemented with any one or combination of electronic circuitry, which may include software, hardware, firmware, or fixed logic circuitry that is implemented in connection with processing and control circuits, which are generally indicated at 1510 (as electronic circuitry 1510). This electronic circuitry 1510 can implement executable or hardware-based modules (not shown in FIG. 15) through logic circuitry and/or hardware (e.g., such as an FPGA), and so forth.

Although not shown, the electronic device 1500 can include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

The electronic device 1500 also includes one or more memory devices 1512 that enable data storage, examples of which include random access memory (RAM), non-volatile memory (e.g., read-only memory (ROM), flash memory, EPROM, and EEPROM), and a disk storage device. The memory device(s) 1512 provide data storage mechanisms to store the device data 1504, other types of code and/or data, and various device applications 1520 (e.g., software applications or programs). For example, an operating system 1514 can be maintained as software instructions within the memory device 1512 and executed by the processor 1508.

As shown, the electronic device 1500 also includes an audio and/or video processing system 1516 that processes audio data and/or passes through the audio and video data to an audio system 1518 (e.g., at least one speaker and one or more microphones) and/or to a display system 1522 (e.g., a video buffer or a screen of a smart phone or camera). The audio system 1518 and/or the display system 1522 may include any devices that process, display, and/or otherwise render or present audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, wireless link, or other similar communication link, such as media data port 1524. In some implementations, the audio system 1518 and/or the display system 1522 are external or separate components of the electronic device 1500. Alternatively, the audio system 1518 and/or the display system 1522 can be an integrated component of the example electronic device 1500, such as if the display system 1522 is part of an integrated touch interface.

The electronic device 1500 of FIG. 15 is an example implementation of the electronic device 102 or 104 of, e.g., FIGS. 1 and 2. Thus, the processor 1508 is an example of the processor 112 or 122. Similarly, the memory device 1512 is an example of the CRM 114 or 124. The electronic device 1500 may further include, e.g. as part of a communication unit 120 or 130 (of FIG. 1), at least one antenna, at least one transceiver, at least one amplifier, at least one baseband processor, and so forth. Thus, the principles of emergency communication in a wireless system as described herein can be implemented by, or in conjunction with, the electronic device 1500 of FIG. 15.

Although implementations for emergency communication in a wireless system have been described in language specific to certain features and/or methods, the subject of the appended claims is not necessarily limited to the specific features or methods described. Rather, the specific features and methods are disclosed as example implementations for emergency communication in a wireless system.

What is claimed is:

1. A method performed by an end-user device for emergency communication, the method comprising:
   determining that a communication is associated with an emergency situation, the communication including emergency communication data;
   elevating a priority of the emergency communication data above that of other communication data corresponding to at least one non-emergency transmission communication;
   transmitting, using a communication unit, the emergency communication data in a first signal towards a base station of a wireless network using a first power level;
   failing to ascertain that the first signal was successfully received by the base station;
   responsive to the failing, determining a second power level that is greater than the first power level; and
   transmitting, using the communication unit, the emergency communication data in a second signal towards the base station of the wireless network using the second power level.

2. The method of claim 1, wherein the determining comprises at least one of:
   inspecting a code indication tagged to the communication;
   detecting an emergency indication input by an end user for the communication; or
   recognizing that a destination number for the communication comprises a value corresponding to an emergency service.

3. The method of claim 1, wherein the elevating comprises at least one of:
   increasing a transmission priority associated with the emergency communication data corresponding to the communication that is associated with the emergency situation; or
   decreasing another transmission priority associated with the other communication data corresponding to the at least one non-emergency transmission communication.

4. The method of claim 1, further comprising temporarily suspending transmission of the other communication data corresponding to the at least one non-emergency transmission communication.

5. The method of claim 1, further comprising canceling transmission of the other communication data corresponding to the at least one non-emergency transmission communication.

6. The method of claim 1, further comprising:
modifying an audio channel of the end-user device responsive to the determining that the communication is associated with an emergency situation.

7. The method of claim 6, wherein the modifying comprises at least one of:
increasing a gain of a microphone;
activating at least a microphone portion of a speakerphone audio mode; or
activating at least one of a beamforming or a directional microphone mode.

8. An end-user device comprising:
at least one processor;
one or more computer-readable storage media including:
at least one transmission data buffer configured to store emergency communication data and other communication data, the emergency communication data associated with a first priority level and the other communication data associated with a second priority level; and the one or more computer-readable storage media storing instructions including:
a transmission priority elevation module configured to elevate the first priority level above the second priority level based on the first priority level being associated with the emergency communication data; and
a communication unit configured to:
transmit the emergency communication data in a first signal to a base station of a wireless network using a first power level;
determine that the first signal was unsuccessfully transmitted to the base station;
responsive to the determining, select a second power level that is greater than the first power level; and
transmit the emergency communication data in a second signal towards the base station of the wireless network using the second power level.

9. The end-user device of claim 8, wherein the transmission priority elevation module is configured to elevate the first priority level above the second priority level by at least one of physically or logically moving the emergency communication data ahead of the other communication data in the transmission data buffer.

10. The end-user device of claim 8, wherein the transmission priority elevation module is configured to elevate the first priority level above the second priority level by at least one of:
temporarily suspending transmission of the other communication data until the emergency communication data is transmitted; or
flushing the other communication data from the transmission data buffer.

11. The end-user device of claim 8, further comprising:
at least one microphone,
wherein the computer-readable storage media stored instructions further include an audio channel modification module configured to modify an audio channel for the at least one microphone to facilitate acquisition of at least a portion of the emergency communication data from an end user.

12. The end-user device of claim 11, wherein the audio channel modification module is configured to at least one of:
increase a sensitivity of the microphone; or
activate a beamforming or a directional microphone mode to facilitate acquisition of the portion of the emergency communication data.

13. The end-user device of claim 11, wherein the audio channel modification module is configured to modify the audio channel for the at least one microphone responsive to a determination that the end-user device is engaged in an emergency communication corresponding to the emergency communication data.

14. The end-user device of claim 8, wherein the computer-readable storage media stored instructions further include;
an emergency communication determination module configured to determine that a communication is associated with an emergency situation while the end-user device is registered with a wireless network under a first category; and
a category selection module configured to:
select a second category responsive to a determination that the communication is associated with an emergency situation, the second category providing a more reliable communication channel as compared to the first category; and
reregister with the wireless network using the second category responsive to the determination.

15. The method of claim 1,
wherein:
the first power level comports with a maximum normal transmission power; and
the second power level is greater than the maximum normal transmission power and is less than or equal to a calibrated maximum transmission power.

16. The method of claim 1, further comprising:
presenting a user interface that enables an end user to activate or deactivate an ability to boost transmission power for an emergency communication; and
accepting a user input based on the presented user interface,
wherein the determining of the second power level is dependent on the accepted user input.

17. The method of claim 1, wherein the transmitting the emergency communication data further comprises:
prior to the transmitting of the second signal, increasing at least one of a power amplifier gain or a supply voltage of a transmitter of the communication unit responsive to the determined second power level.

18. The method of claim 1, further comprising:
determining, for the communication that is associated with an emergency situation, a radio access technology (RAT) based on a location of the end-user device.

19. The method of claim 1, further comprising:
adjusting a characteristic of a communication protocol for the communication that is associated with an emergency situation to increase a reliability of the communication,
wherein the characteristic includes at least one of a modulation scheme, an assigned parameter, or a device category.

20. The end-user device of claim 8, wherein:
the first power level comports with a maximum normal transmission power; and
the second power level is greater than the maximum normal transmission power and is less than or equal to a calibrated maximum transmission power.

* * * * *

UNITED STATES PATENT AND TRADEMARK OFFICE
CERTIFICATE OF CORRECTION

PATENT NO. : 10,448,233 B2  
APPLICATION NO. : 15/986754  
DATED : October 15, 2019  
INVENTOR(S) : Jibing Wang et al.

Page 1 of 1

It is certified that error appears in the above-identified patent and that said Letters Patent is hereby corrected as shown below:

In the Claims

Column 28, Lines 11 and 12, after "further" before "an" delete "include;" insert --include:--

Signed and Sealed this
Twenty-sixth Day of November, 2019

Andrei Iancu
*Director of the United States Patent and Trademark Office*